US011757627B2

(12) United States Patent
Monica et al.

(10) Patent No.: US 11,757,627 B2
(45) Date of Patent: *Sep. 12, 2023

(54) CRYPTOASSET CUSTODIAL SYSTEM WITH PROOF-OF-STAKE BLOCKCHAIN SUPPORT

(71) Applicant: Anchor Labs, Inc., San Francisco, CA (US)

(72) Inventors: Diogo Monica, San Francisco, CA (US); Nathan P. McCauley, San Francisco, CA (US); Boaz Avital, San Francisco, CA (US); Riyaz D. Faizullabhoy, Los Altos, CA (US)

(73) Assignee: Anchor Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,327

(22) Filed: Apr. 7, 2022

(65) Prior Publication Data
US 2022/0277302 A1 Sep. 1, 2022

Related U.S. Application Data

(63) Continuation of application No. 16/544,628, filed on Aug. 19, 2019, now Pat. No. 11,301,845.

(51) Int. Cl.
H04L 9/08 (2006.01)
G06Q 20/36 (2012.01)
(Continued)

(52) U.S. Cl.
CPC ....... H04L 9/0825 (2013.01); G06Q 20/3672 (2013.01); G06Q 20/3674 (2013.01);
(Continued)

(58) Field of Classification Search
None
See application file for complete search history.

(56) References Cited

U.S. PATENT DOCUMENTS 6,950,523 B1 * 9/2005 Brickell ................ H04L 9/3236
   707/999.009
9,892,460 B1 * 2/2018 Winklevoss ........... G06Q 40/04
(Continued)

FOREIGN PATENT DOCUMENTS

EP        2306668 A1 *  4/2011  ........... H04L 9/0838
WO  WO-2016029119 A1 *  2/2016  ............. G06Q 20/00
(Continued)

OTHER PUBLICATIONS

R. Hill, J. Al-Muhtadi and W. E. Byrd, "An Access Control Architecture for Distributing Trust in Pervasive Computing Environments," 2010 IEEE/IFIP International Conference on Embedded and Ubiquitous Computing, 2010, pp. 695-702, doi: 10.1109/EUC.2010.110. (Year: 2010).

(Continued)

Primary Examiner — Neha Patel
Assistant Examiner — Jahed Ali
(74) Attorney, Agent, or Firm — Bookoff McAndrews, PLLC

(57) ABSTRACT

Methods and systems for secure storage and retrieval of information, such as private keys, useable to control access to a blockchain, include: receiving, in a cryptoasset custodial system, a request to authorize a staking operation associated with a blockchain, wherein the staking operation is associated with a private key of an asymmetric cryptographic key pair, the private key is usable to control ownership of a cryptoasset recorded in the blockchain, and the private key is securely held in the custodial system; performing, in response to the request, a portion of the proof-of-stake protocol in a hardware security module using logic designed for the protocol, wherein the logic in the hardware security module is configured to authorize the staking operation by digitally signing an associated staking transaction; and send- (Continued)

ing the digitally signed staking transaction to another computer to effect the staking operation on behalf of the user.

20 Claims, 16 Drawing Sheets

(51) Int. Cl.
*G06Q 20/38* (2012.01)
*H04L 9/06* (2006.01)

(52) U.S. Cl.
CPC ... *G06Q 20/3829* (2013.01); *G06Q 20/38215* (2013.01); *H04L 9/0637* (2013.01)

(56) References Cited

U.S. PATENT DOCUMENTS

| | | | |
|---|---|---|---|
| 9,916,581 | B2 | 3/2018 | Dorsey et al. |
| 10,068,228 | B1 | 9/2018 | Winklevoss et al. |
| 10,325,088 | B2* | 6/2019 | Chen .................. H04W 12/08 |
| 10,360,191 | B2* | 7/2019 | Christidis ........... G06F 16/1865 |
| 10,362,032 | B2* | 7/2019 | Fitzgerald ............... H04L 63/10 |
| 10,373,158 | B1* | 8/2019 | James ..................... G06Q 40/04 |
| 10,439,811 | B2 | 10/2019 | Norton |
| 11,030,280 | B2* | 6/2021 | Asanghanwa ........ H04L 9/0819 |
| 11,176,506 | B2* | 11/2021 | Konik .................. G06Q 20/382 |
| 11,354,629 | B1* | 6/2022 | Nelson .................. H04L 9/0637 |
| 11,418,338 | B2* | 8/2022 | Monica ................. H04L 9/0894 |
| 2002/0099938 | A1* | 7/2002 | Spitz ..................... H04L 9/3247 |
| | | | 713/155 |
| 2004/0128504 | A1 | 7/2004 | Kivinen |
| 2004/0236694 | A1 | 11/2004 | Tattan |
| 2005/0273442 | A1 | 12/2005 | Bennett |
| 2008/0031460 | A1 | 2/2008 | Brookner et al. |
| 2010/0024017 | A1 | 1/2010 | Ashfield et al. |
| 2010/0119061 | A1 | 5/2010 | Kawale |
| 2011/0154025 | A1 | 6/2011 | Spalka |
| 2012/0192260 | A1 | 7/2012 | Kontsevich |
| 2014/0046842 | A1 | 2/2014 | Irudayam |
| 2014/0156534 | A1* | 6/2014 | Quigley ................. G06Q 20/34 |
| | | | 705/71 |
| 2015/0170112 | A1* | 6/2015 | DeCastro ............. G06Q 20/381 |
| | | | 705/39 |
| 2015/0287026 | A1* | 10/2015 | Yang ..................... G06Q 20/065 |
| | | | 705/69 |
| 2015/0373122 | A1 | 12/2015 | Steel et al. |
| 2016/0012424 | A1* | 1/2016 | Simon ..................... G06Q 20/36 |
| | | | 705/67 |
| 2016/0189134 | A1 | 6/2016 | Voege et al. |
| 2016/0283920 | A1 | 9/2016 | Fisher et al. |
| 2016/0285872 | A1 | 9/2016 | Polar |
| 2017/0006018 | A1 | 1/2017 | Campagna |
| 2017/0154331 | A1* | 6/2017 | Voorhees ................. H04L 63/06 |
| 2017/0230375 | A1* | 8/2017 | Kurian .................. G06Q 20/382 |
| 2017/0373849 | A1* | 12/2017 | Donner ..................... H04L 9/30 |
| 2017/0374033 | A1 | 12/2017 | Kovacs |
| 2018/0107958 | A1* | 4/2018 | Konik ................. G06Q 10/0637 |
| 2018/0109541 | A1* | 4/2018 | Gleichauf ............... H04W 8/24 |
| 2018/0130158 | A1 | 5/2018 | Atkinson et al. |
| 2018/0181737 | A1 | 6/2018 | Tussy |
| 2018/0294967 | A1* | 10/2018 | Roberts ................. H04L 9/3255 |
| 2018/0367311 | A1* | 12/2018 | Stahlberg ............ H04L 63/0853 |
| 2018/0367316 | A1 | 12/2018 | Cheng et al. |
| 2019/0043022 | A1 | 2/2019 | Fosmark et al. |
| 2019/0124146 | A1* | 4/2019 | Austin .................. G06Q 20/223 |
| 2019/0188806 | A1* | 6/2019 | Torrenegra .............. G06F 17/11 |
| 2019/0207915 | A1 | 7/2019 | Schaap |
| 2019/0236594 | A1* | 8/2019 | Ehrlich-Quinn ..... G06Q 20/401 |
| 2019/0251524 | A1 | 8/2019 | Sadrizadeh et al. |
| 2019/0266576 | A1 | 8/2019 | McCauley et al. |
| 2019/0268165 | A1 | 8/2019 | Monica et al. |
| 2019/0280864 | A1* | 9/2019 | Cheng .................. H04L 9/3239 |
| 2019/0305956 | A1 | 10/2019 | Irani, III |
| 2019/0347666 | A1 | 11/2019 | Bermudez-Cisneros et al. |
| 2019/0356491 | A1 | 11/2019 | Herder, III et al. |
| 2019/0372779 | A1* | 12/2019 | Monica ..................... H04L 9/14 |
| 2020/0167338 | A1 | 5/2020 | Brock et al. |
| 2020/0266997 | A1 | 8/2020 | Monica et al. |
| 2020/0294033 | A1* | 9/2020 | Wilson ............... G06Q 20/0658 |
| 2020/0374270 | A1* | 11/2020 | Mishra .................. A63F 13/795 |
| 2020/0380523 | A1* | 12/2020 | Agrawal ............ G06Q 20/3226 |
| 2021/0042823 | A1* | 2/2021 | McClelland ........... G06Q 40/04 |
| 2021/0056547 | A1* | 2/2021 | Monica .............. G06Q 20/3674 |
| 2021/0097528 | A1* | 4/2021 | Wang ........................ H04L 9/30 |
| 2021/0097532 | A1* | 4/2021 | Mahasuverachai .. G06Q 20/401 |

FOREIGN PATENT DOCUMENTS

| | | | | |
|---|---|---|---|---|
| WO | WO-2018189658 | A1 * | 10/2018 | ............. G06F 21/64 |
| WO | WO 2019/168792 | | 9/2019 | |

OTHER PUBLICATIONS

N. Sukhija, E. Bautista, M. Moore and J. Sample, "Employing Blockchain Technology for Decentralized Crowdsourced Data Access and Management," 2019 IEEE SmartWorld, Ubiquitous Intelligence & Computing, Advanced & Trusted Computing, Scalable Computing & Communications, Cloud & Big Data Computing, (Year: 2019).

Anonymous: "Hierarchical Deterministic: Wallets—BIP32", Feb. 2017, Retrieved from the Internet: URL:https://github.com/bitcoin/bips/blob(11b0fa37bee4eac40c3a1be059107868$bcc3392/bip-0032.mediawiki [retrieved on Jun. 20, 2018].

Anonymous: "How to properly secure cryptocurrencies exchanges—Ledger", Aug. 2016, Retrieved from the Internet: URL:https://www.ledger.fr/2016/08/08/hcpw-to-properly-secure-cryptocurrencies-exchanges/ [retrieved on Jun. 29, 2018].

Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.

International Search Report and Written Opinion in Application No. PCT/US2019/019425, dated May 9, 2019, 12 pages.

International Search Report and Written Opinion in Application No. PCT/US2019/019414, dated May 15, 2019, 12 pages.

Monica, "Crypto Anchors: Exfiltration Resistant Infrastructure," 11 pages, dated Oct. 8, 2017.

Monica, "Increasing Attacker Cost Using Immutable Infrastructure," 8 pages, dated Nov. 19, 2016.

Monica, "The two metrics that matter for host security," 6 pages, dated Aug. 31, 2017.

Wired.com [online], "Crypto anchors' might stop the next Equifax-style megabreach," Oct. 11, 2017, retrieved from: URLhttps://www.wired.com/story/crypto-anchors-breach-security/>, 11 pages.

bisontrails.co [online] "Bison Trails is the easiest way to run infrastructure on multiple blockchains," Retrieved on Jul. 31, 2019, Retrieved from URL <https://bisontrails.co/?gclid=EAIaIQobChMItuuNvOuU5QIVB6vsChllvQvyEAAYASAAEglw3vD_BwE>, 6 pages.

U.S. Appl. No. 16/276,567, filed Feb. 14, 2019, Monica et al.

Bonneau et al., "SoK: Research Perspectives and Challenges for Bitcoin and Cryptocurrencies," 2015 IEEE Symposium on Security and Privacy, May 17-21, 2015, San Jose, CA, USA, 104-121.

Liu et al., "Security Analysis of Electronic Payment Protocols Based on Quantum Cryptography," 2017 4th International Conference on Information Science and Control Engineering, Jul. 21-23, 2017, Changsha, China, 1709-1712.

Response to U.S. Office Action in U.S. Appl. No. 16/544,740, dated Jul. 31, 2020, 15 pages.

U.S. Notice of Allowance in U.S. Appl. No. 16/544,740, dated Aug. 18, 2020, 12 pages.

U.S. Office Action in U.S. Appl. No. 16/544,740, dated Jun. 2, 2020, 47 pages.

PCT International Search Report and Written Opinion in International Appln. No. PCT/US2020/017411, dated Apr. 15, 2020, 19 pages.

Anonymous: "CASP Solution Overview,"and "Installing Casp" Mar. 2019, retrieved from the Internet: URL: https://www.unboundtech.

(56) References Cited

OTHER PUBLICATIONS com/docs/CASP/Versions/1.0.1902/CASP User GuideHTML/Content/Products/CASP/CASP_Offering_Description/Solution.htm#h2 10, 5 pages.
PCT International Search Report and Written Opinion in International Appln. No. PCT/US2020/043882, dated Nov. 2, 2020. 12 pages.
PCT International Search Report and Written Opinion in International Appln. No. PCT/US2020/045737, dated Nov. 11, 2020. 12 pages.
Sato et al., ""General Security Considerations for Cryptoassets Custodians draft-vcgtf-crypto-assets-security-considerations-04,"" Apr. 2019, retrieved from the Internet: URL:https://tools.ietf.org/html/draft-vcgtf-crypto-assets-security-considerations-04, 47 pages.

* cited by examiner

CRYPTOASSET CUSTODIAL SYSTEM WITH PROOF-OF-STAKE BLOCKCHAIN SUPPORT

BACKGROUND

Technical Field

This specification relates to computer-implemented systems and techniques for secure storage and retrieval of information, such as private keys, useable to control access to a blockchain.

Description of Related Art

A blockchain is a distributed ledger technology that enables multiple users to produce and share a verifiable record of every transaction made in a system that uses the blockchain. Blockchains can be public, private, or include both publicly and privately accessible portions. In any case, the blockchain is updated only by consensus among designated users of the system. Thus, a blockchain represents a consensus of replicated, shared, and synchronized digital data spread across multiple nodes, without a central administrator or centralized data storage. Replication and sharing, in addition to the use of cryptographic hashing techniques, give the blockchain-based distributed ledger its characteristic resiliency and protection against unauthorized alteration. However, the lack of a central administrator can also result in new risks when access keys for the blockchain are lost or stolen. This can be of particular concern when the blockchain includes large amounts of cryptographic assets, also referred to as cryptoassets, such as BITCOIN, ETHEREUM, and RIPPLE cryptocurrencies.

Such cryptocurrencies have gained in popularity and value in recent years and are expected by many to continue to do so. Every day an increasing variety of transactions are conducted based on cryptocurrencies, and it is conceivable that new types of cryptoassets may be created in the future, i.e., cryptoassets that are not necessarily currencies. With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" devices are sometimes used to store cryptocurrency, however, those devices limit access only to the owner of the device and are therefore not suitable for many business uses, where a number of individuals may require access to cryptocurrencies or other cryptoassets.

SUMMARY

This specification describes technologies relating to computer-implemented systems and techniques for secure storage and retrieval of information, such as private keys, useable to control access to a blockchain, where the systems and techniques can securely hold private keys that control ownership of cryptoassets (allowing an entity to serve as a custodian of those cryptoassets) while concurrently enabling those private keys to participate in online protocols that requires active use of the private keys, such as staking and governance protocols. In the context of a cryptoasset custodial system, the technical security measures taken may be breached and cryptoassets can be stolen if an access control mechanism used by the system is compromised. Thus, ensuring that access control in a cryptoasset custodial system provides sufficient technical security measures to reduce or eliminate the risk of breach is of utmost importance.

Hardware Security Modules (HSMs) can be used to enable staking and governance protocols in a secure manner for digital assets held in a cryptoasset custodial system. This can involve the HSMs authenticating client actions by verifying signatures created by personal devices, e.g., iPhones, which hold dedicated keys in hardware. The HSMs will be kept sufficiently available (e.g., air-gap switching every minute or less) in order to participate at the appropriate frequency required by the supported staking and governance protocols. Thus, staking and governance protocols that require active use of private keys can be supported even when those private keys are held securely in a custodial system, as the HSMs can actively participate in staking and governance operations (producing messages at a fairly quick pace) while still securely holding the private keys behind the air gap. Moreover, by using custom firmware in the HSMs, code can be written that is adaptable to different kinds of staking and governance protocols, and updates can be readily made as the protocol(s) change and/or new staking and governance protocols are created.

One or more aspects of the subject matter described in this specification can be embodied in one or more first embodiments that include one or more methods including: receiving, in a cryptoasset custodial system, a request to authorize a staking operation for a proof-of-stake protocol associated with a blockchain, wherein the staking operation is associated with a private key of an asymmetric cryptographic key pair, the private key is usable to control ownership of a cryptoasset recorded in the blockchain, and the private key is securely held in the cryptoasset custodial system on behalf of a user of the cryptoasset custodial system; performing, in response to the request, at least a portion of the proof-of-stake protocol in a hardware security module using logic designed for the proof-of-stake protocol, wherein the cryptoasset custodial system comprises the hardware security module, the hardware security module comprising at least one secure storage device and at least one physical computing device coupled with the at least one secure storage device, and the logic in the hardware security module is configured to authorize the staking operation by digitally signing a staking transaction associated with the staking operation; and sending the digitally signed staking transaction to another computer to effect the staking operation on behalf of the user.

The cryptoasset custodial system can include a relay computer communicatively coupled with the hardware security module through an air gap that isolates the hardware security module from a network outside the cryptoasset custodial system, and the method can include performing at least another portion of the proof-of-stake protocol in the relay computer.

The method can further include confirming, by the relay computer, that a format of the staking transaction conforms to the proof-of-stake protocol, and performing the at least a portion of the proof-of-stake protocol in the hardware security module can include reconfirming that the format of the staking transaction conforms to the proof-of-stake protocol.

The cryptoasset custodial system can include an online server computer communicatively coupled with the relay computer, the logic in the hardware security module can include firmware code programmed to handle different staking transactions for two or more proof-of-stake protocols, and the method can include: performing an additional portion of the proof-of-stake protocol in the online server computer; and adjusting a timing control for the air gap based on the different staking transactions for the two or more proof-of-stake protocols.

The method can include: decrypting an encrypted key, in the hardware security module using a hardware-based cryptographic key securely stored in the hardware security module, to reveal a decrypted key; deriving, in the hardware security module, the private key of the asymmetric cryptographic key pair from at least the decrypted key; digitally signing, in the hardware security module, the staking transaction using the private key derived in the hardware security module; and deleting the private key from memory in the hardware security module.

The method can include: verifying, in the hardware security module, a policy map specifying individual users of the cryptoasset custodial system and a threshold number of the individual users to approve the staking operation; validating, in the hardware security module, endorsement messages from at least a subset of the specified individual users of the cryptoasset custodial system by checking cryptographic digital signatures using public keys corresponding to the subset of the specified individual users; and confirming, in the hardware security module, the staking operation is in accordance with control rules of the policy map when the endorsement messages have been validated for the threshold number of the specified individual users.

The cryptoasset can be assigned to one of multiple different vaults in the cryptoasset custodial system, each of the multiple different vaults can have a vault-specific policy map that defines vault control rules governing which actions are allowed for the vault under one or more specified conditions, the policy map specifying the individual users can be the vault-specific policy map corresponding to the one of the multiple different vaults to which the cryptoasset has been assigned, and deriving the private key can include regenerating the private key by applying a deterministic key derivation function to at least an identifier for the vault for the cryptoasset, an asset identifier for the cryptoasset, and the decrypted key In general, another innovative aspect of the subject matter described in this specification can be embodied in one or more second embodiments of a system including: one or more hardware security modules, each of the one or more hardware security modules comprising at least one secure storage device and at least one physical computing device coupled with the at least one secure storage device and configured to provide cryptographic processing to manage private keys of asymmetric cryptographic key pairs usable to control ownership of cryptoassets in at least one blockchain; and one or more server computers communicatively coupled with the one or more hardware security modules to access the cryptographic processing performed by the at least one physical computing device using the private keys; wherein the at least one physical computing device of each of the one or more hardware security modules is configured to: check a requested staking action for a managed private key against a policy map corresponding to the managed private key after authenticating the policy map based on a cryptographic key controlled by the hardware security module, confirm that a format of the requested staking action conforms to a proof-of-stake protocol for the requested staking action, digitally sign the requested staking action with the managed private key when the requested staking action is authorized in accordance with the policy map and the format conforms to the proof-of-stake protocol, and send the digitally signed staking action to another computer to effect one or more staking operations.

The one or more server computers can include at least one relay server computer communicatively coupled with the hardware security module through an air gap that isolates the hardware security module, and the at least one relay server computer can be configured to perform at least a portion of the proof-of-stake protocol.

The one or more server computers can include at least one online server computer communicatively coupled with the at least one relay server computer, the at least one online server computer can be configured to accept requests from a public computer network and to perform an additional portion of the proof-of-stake protocol, each of the one or more hardware security modules can include firmware configured to handle different staking transactions for two or more proof-of-stake protocols, and one or more of the at least one online server computer and the at least one relay server computer can be configured to adjust a timing control for the air gap based on the different staking transactions for the two or more proof-of-stake protocols.

The at least one physical computing device of each of the one or more hardware security modules can be configured to: decrypt an encrypted key, using a hardware-based cryptographic key securely stored in the hardware security module, to reveal a decrypted key; derive the managed private key from at least the decrypted key; digitally sign the requested staking action using the managed private key derived in the hardware security module; and delete the managed private key from memory in the hardware security module.

The at least one physical computing device of each of the one or more hardware security modules can be configured to: verify the policy map specifying individual users of the system and a threshold number of the individual users to approve a staking operation; validate endorsement messages from at least a subset of the specified individual users by checking cryptographic digital signatures using public keys corresponding to the subset of the specified individual users; and confirm the staking operation is in accordance with control rules of the policy map when the endorsement messages have been validated for the threshold number of the specified individual users.

The private keys usable to control ownership of the cryptoassets can be organized into logical groupings, each of the logical groupings can have an associated policy map that defines rules governing which actions are allowed for the logical grouping under one or more specified conditions, the policy map specifying the individual users can be the policy map associated with one of the logical groupings corresponding to the managed private key, and the at least one physical computing device of each of the one or more hardware security modules can be configured to derive the managed private key by applying a deterministic key derivation function to at least an identifier of the one of the logical groupings corresponding to the managed private key, an asset identifier, and the decrypted key.

The first and second sets of embodiments can be implemented using one or more computer-readable mediums encoding one or more computer programs operable to cause a hardware security module, including at least one secure storage device and at least one physical computing device coupled with the at least one secure storage device, to perform operations including: receiving, in a cryptoasset custodial system, a request to authorize a staking operation for a proof-of-stake protocol associated with a blockchain, wherein the staking operation is associated with a private key of an asymmetric cryptographic key pair, the private key is usable to control ownership of a cryptoasset recorded in the blockchain, and the private key is securely held in the cryptoasset custodial system on behalf of a user of the cryptoasset custodial system; performing, in response to the request, at least a portion of the proof-of-stake protocol in a hardware security module using logic designed for the proof-of-stake protocol, wherein the logic in the hardware security module is configured to authorize the staking operation by digitally signing a staking transaction associated with the staking operation; and sending the digitally signed staking transaction to another computer to effect the staking operation on behalf of the user.

The cryptoasset custodial system can include a relay computer communicatively coupled with the hardware security module through an air gap that isolates the hardware security module from a network outside the cryptoasset custodial system.

Performing the at least a portion of the proof-of-stake protocol in the hardware security module can include reconfirming that a format of the staking transaction conforms to the proof-of-stake protocol.

The cryptoasset custodial system can include an online server computer communicatively coupled with the relay computer, and the logic in the hardware security module can include firmware code programmed to handle different staking transactions for two or more proof-of-stake protocols.

The operations can include: decrypting an encrypted key, using a hardware-based cryptographic key securely stored in the hardware security module, to reveal a decrypted key; deriving the private key of the asymmetric cryptographic key pair from at least the decrypted key; digitally signing the staking transaction using the private key derived in the hardware security module; and deleting the private key from memory in the hardware security module.

The operations can include: verifying a policy map specifying individual users of the cryptoasset custodial system and a threshold number of the individual users to approve the staking operation; validating endorsement messages from at least a subset of the specified individual users of the cryptoasset custodial system by checking cryptographic digital signatures using public keys corresponding to the subset of the specified individual users; and confirming the staking operation is in accordance with control rules of the policy map when the endorsement messages have been validated for the threshold number of the specified individual users.

The cryptoasset can be assigned to one of multiple different vaults in the cryptoasset custodial system, each of the multiple different vaults can have a vault-specific policy map that defines vault control rules governing which actions are allowed for the vault under one or more specified conditions, the policy map specifying the individual users can be the vault-specific policy map corresponding to the one of the multiple different vaults to which the cryptoasset has been assigned, and deriving the private key can include regenerating the private key by applying a deterministic key derivation function to at least an identifier for the vault for the cryptoasset, an asset identifier for the cryptoasset, and the decrypted key.

BRIEF DESCRIPTION OF THE DRAWINGS

Various embodiments of the present disclosure are shown by way of example and not limitation in the figures of the accompanying drawings, in which like references indicate similar elements.

DETAILED DESCRIPTION

Figure 1A:
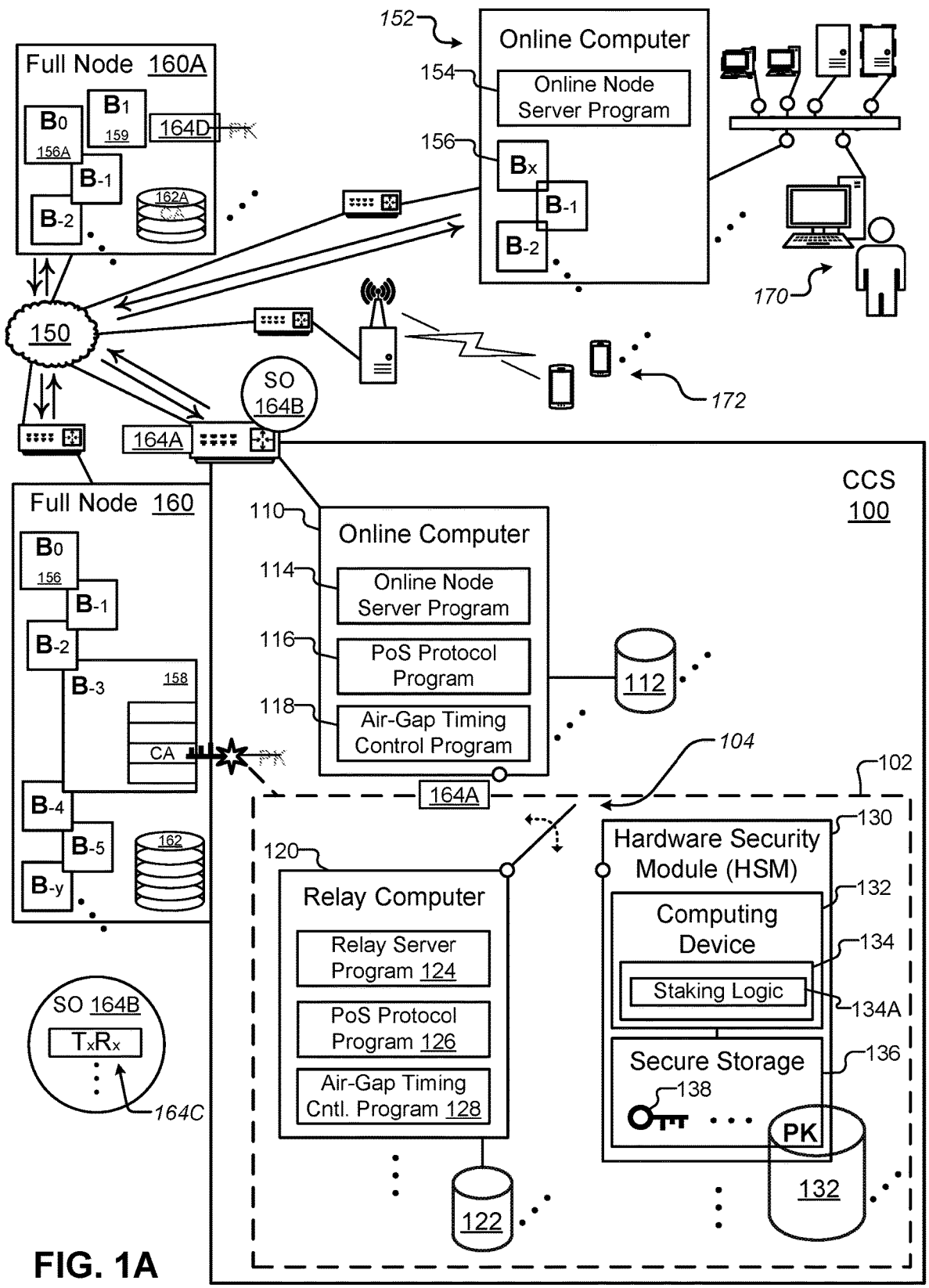
FIG. 1A is a schematic diagram showing an example of a cryptoasset custodial system (CCS) participating in staking and governance in a proof-of-stake distributed ledger system.

In this description, references to "an embodiment", "one embodiment" or the like, mean that the particular feature, function, structure or characteristic being described is included in at least one embodiment of the systems and techniques being described. Occurrences of such phrases in this specification do not necessarily all refer to the same embodiment. On the other hand, the embodiments referred to also are not necessarily mutually exclusive.

Overview

Introduced here is a computer-implemented cryptoasset custodial system (CCS), i.e., a computer-implemented system for maintaining custody of, and controlling access to, cryptocurrencies and/or other cryptoassets. The CCS may be owned and/or operated by a business enterprise, referred to herein as the Cryptoasset Custodian, on behalf of one or more customers who may each have multiple users (employees or retail customers) of the CCS. The CCS can employ various technologies to enable safe participation in digital asset staking/governance protocol(s) with online hardware. These technologies include one or more hardware security modules (HSMs) that both securely hold private keys (explicitly in storage or implicitly using one or more stored HSM keys and one or more key generation algorithms) and also include staking logic in the HSMs configured to authorize staking operations (staking and governance in a proof-of-stake distributed ledger system) using those held private keys. As used herein, the term "hardware security module" or "HSM" refers to a special-purpose physical computing device that safeguards and manages digital keys for authentication and provides cryptoprocessing functionality. The HSM can be embodied as a plug-in card or an external device that attaches directly to a computer.

Including staking logic in the HSMs in a CCS can facilitate the ability of the CCS to adapt to different staking protocols, which can be of particular importance when staking protocols change over time as distributed ledger technologies evolve for various cryptoassets. For example the staking logic in the HSMs can be customized staking-protocol-specific firmware in the HSMs, where that firmware can be updated as needed by configuring it with new code. Further, the technologies that enable safe participation in digital asset staking/governance protocol(s) with online hardware can include a half-duplex communication channel that passes through one or more relay servers (e.g., in one or more data centers) of the CCS such that a secure zone is created by the relay server(s) being isolated (e.g., air gapped) from any online computers or networks during full duplex communication with HSM(s) of the CCS. This allows the private keys to be held securely while also being actively available (e.g., accessible once per minute, per hour, per day, per week, or per a configurable time interval) for staking/governance in a distributed ledger system.

Moreover, the technologies that enable safe participation in digital asset staking/governance protocol(s) can further include a cryptoasset agnostic authorization layer, which uses one or more layers of key indirection in one or more cryptoasset vaults. Authorization for staking and governance can be provided using client keys, with optional endorsement messages for user authorization of transactions based on risk analysis, to further enhance security and increase robustness of the CCS in the face of changing distributed ledger and blockchain technologies. In some embodiments, the CCS includes logical groupings of cryptoassets (referred to as "vaults") to limit access to the private keys usable to control access to the cryptoassets in at least one blockchain, where the logical groupings are controlled by one or more HSMs. In some embodiments, the CCS includes a combination of biometric-based multi-user validation, transaction risk analysis, and use of HSMs to provide authentication/ validation functionality and secure storage of private keys of cryptoassets. Furthermore, two or more different biometric authentication techniques may be applied to any given transaction request.

In addition, in some embodiments, when a user requests a transaction involving a cryptoasset, such as a withdrawal, a transfer, or a staking operation involving cryptocurrency funds, the CCS causes an endorsement request message to be sent to each of multiple user devices, each of which is associated with a different user who has been defined as a potential member of a quorum for transactions involving that cryptoasset (in other embodiments, multiple users may share the same user device). The endorsement request message is configured to cause each receiving user device to prompt its user to provide an endorsement of the requested transaction. An endorsement in this context is an approval or rejection of an operation by a user. When a user receiving such a prompt endorses the transaction on his or her user device (e.g., a smartphone, tablet or notebook computer), the user device signs an endorsement message with a private key of that user and transmits the signed endorsement message to the CCS. The private key is stored within a secure enclave within the user device. A secure enclave in each user device is used to store the corresponding user's private key and to generate digital signatures of that user.

For any action with respect to a vault, the HSM determines whether the policy map for the vault is authentic, and if so, the HSM only allows the action when it conforms to the rules set forth in the authenticated policy map. In some embodiments, the HSM determines whether a policy-based quorum of multiple users has endorsed (approved) a requested action, such as a withdrawal, transfer or staking operation involving cryptocurrency funds. It does this by validating the signature using a public key of a public-private key pair for each of the plurality of users, in endorsement messages received from the users. After determining that the policy-based quorum of the multiple users has validly endorsed the requested action, the HSM then allows itself to access the private key of that particular cryptographic asset (e.g., for a specific staking of cryptocurrency funds to a full validating node), which private key the HSM previously generated, and uses that private key to sign the transaction as authorization that the transaction may proceed. The private key for that cryptoasset is stored in (or otherwise controlled by) only the HSM (or group of associated HSMs), which does not permit the key to be obtained by any entity outside the HSM (or the group of associated HSMs). Approval of the transaction may include, for example, transmitting the transaction onto a known blockchain network. In some embodiments, approval of the transaction by the HSM occurs only if and after the requested transaction has passed a risk review, which may be partially or fully automated.

Other details will become apparent from the description that follows. Further, it is contemplated that the system and techniques introduced here can be used for secure custody of other types of digital assets besides cryptoassets. Moreover, it is contemplated that the system and techniques introduced here can be used to facilitate using private keys held securely in a custodial system with additional protocols (other than staking/governance protocols) that require active use of the private keys.

Cryptoasset Custodial System (CCS)

FIG. 1A is a schematic diagram showing an example of a CCS 100 participating in staking and governance in a proof-of-stake distributed ledger system. The CCS 100 includes various computers 110, 120, 130 and associated storage 112, 122, 132, as described in further detail below. In general, each computer 110, 120, 130 includes one or more hardware processors configured to operate in accordance with instructions, which can be encoded in a computer-readable medium and/or implemented using computer circuitry designed to effect the instructions, and the storage 112, 122, 132 can include both volatile memory devices (e.g., to retain data that is processed in the CCS 100 and to retain the instructions during such processing) and non-volatile memory devices to store such instructions and/or data for the CCS 100. Thus, the storage 112, 122, 132 represents both storage devices integrated with computing devices to form the computers 110, 120, 130, as well as permanent storage facilities for the CCS 100 that are external to the computers 110, 120, 130. For further details regarding storage facilities and options for distribution of storage facilities used by the CCS 100 across one or more databases, which can be cloud-based and accessible over a computer network 150, see U.S. application Ser. No. 16/276, 567, filed on Feb. 14, 2019, and titled "CRYPTOASSET CUSTODIAL SYSTEM WITH DIFFERENT CRYPTOGRAPHIC KEYS CONTROLLING ACCESS TO SEPARATE GROUPS OF PRIVATE KEYS", which application is hereby incorporated by reference in its entirety.

One or more computers 110 include an online server program 114, which connects the CCS 100 to the computer network 150. The computer network 150 can be a public network, a private network, a virtual private network, etc. The computer network 150 provides communication paths between the CCS 100 and other computer systems 152, which are also connected to the network 150 and which can also include hardware processors, computer-readable mediums, and storage facilities. Each such computer system 152 can include various instructions for performing processing and communicating over the network 150, as will be appreciated. Each such set of instructions implemented in a computer system 152 is referred to as a "node", which can operate as a server and/or a client, as a redistribution point or a communication endpoint within the computer network 150, and can include a physical network device or share a physical network device with another node, i.e., a virtual node. In other words, each node on the network 150 is a point where a message can be created, received, or transmitted.

For example, a computer system 152 can include an online node server program 154 that configures the computer system 152 to operate as a full node (e.g., a full validating node for a proof-of-stake distributed ledger system) with a blockchain 156, a supernode (e.g., a full node that is publicly visible and serves as a redistribution point for the proof-of-stake distributed ledger system), a miner node (for a proof-of-work distributed ledger system), or a lightweight node (e.g., a Simplified Payment Verification (SPV) client) in relation to the blockchain 156. To further illustrate this, a full validating node 160 for a proof-of-stake distributed ledger system includes a copy of the blockchain 156, which includes a block 158, which includes a cryptoasset CA controlled by a private key PK.

Each such validating node 160 for the proof-of-stake distributed ledger system also has its own associated stake 162, which affects whether or not the validating node 160 (among many) will be selected as the validator (forger) for the next block to be added to the blockchain 156, along with potentially one or more other factors, such as staking age (e.g., block selection based on coin age=number of days staked times the number of cryptoassets staked) and randomization (e.g., randomized block selection based on a combination of lowest hash value and highest stake). As will be appreciated, the number of cryptoassets locked into the stake 162 for any given validating node 160 can change over time, and any given validating node 160 can also cease operating as a full node and then restart operating as a full node later, and in both such cases, the stake and rewards (or portions thereof) for validating blocks in the blockchain 156 will be released after a time sufficient to ensure that there were no fraudulent blocks added to the blockchain 156 by the full node 160.

Within this context of a proof-of-stake distributed ledger system operating on a blockchain 156, an example of a staking operation is now described in detail. In this example, the staking operation described is that of initially locking the cryptoasset CA into a stake 162A of a full node 160A, but as will be appreciated, a staking operation that is performed using the systems and techniques of this disclosure can include various portions of staking and governance protocols, including for staking and governance protocols that have not yet been designed or deployed. In addition, while this example shows a single cryptoasset CA in a blockchain 156 being locked into a stake 162A of a full node 160A that serves as a validator for that same blockchain 156, it will be appreciated that this is but one example and other staking and governance operations are possible; note that interactions within a single blockchain can affect multiple assets that are hosted on it (e.g., ERC20 tokens on ETH blockchain).

A request 164A is received in the CCS 100, where the request 164A is to authorize a staking operation 164B communicated between the CCS 100 and a full node. For example, the request 164A can be received by the online server program 114 of the computer 110 from a computer system 152 (e.g., a desktop computer in an enterprise network or a mobile phone 172) operated by a user 170, where the request is to lock the cryptoasset CA into the stake 162A of the full node 160A for the distributed ledger for the blockchain network 156, 156A. As will be appreciated, the request 164A can indicate more than one cryptoasset, but only one cryptoasset CA is discussed here for ease of presentation. In some implementations, the request 164A identifies the specific node 160A to be staked (or a set of full nodes to select from). In some implementations, the request 164A does not identify a specific node, and the CCS 100 monitors the blockchain network for indicators that a staking opportunity has arisen and then generates a request 164A internally for submission to a secure zone 102, as described further below. The CCS 100 can identify which full node 160A out of many full nodes 160 (or out of set of pre-approved full nodes) to stake on behalf of the user 170. In some implementations, a choice can be made, e.g., depending on the asset type, between selecting the full node 160A from a set of whitelisted nodes that have been vetted, or allowing the user 170 or the owner of cryptoassets to choose a full node or a set of pre-approved full nodes.

In some implementation, the computer 110 includes a proof-of-stake protocol program 116, which enables the computer 110 to perform some of the peer-to-peer (P2P) processing and communicating needed to effect the proof-of-stake protocol for the blockchain network 156, 156A. Moreover, in some implementations, the program 116 enables a computer 110 within the CCS 100 to operate as a full validating node. Thus, a computer 110 within the CCS can perform the operations described below for node 160A.

In any case, the request 164A needs to be communicated to another computer 120, which is inside the secure zone 102 of the CCS 100. The computer 120 includes a relay server program 124, and the computer 120 is separated from the computer 100 by an air gap 104, which creates the secure zone 102 for the CCS 100. The HSM 130 has no direct access to any network outside the CCS 100, and all communications from the HSM 130 to any network outside the secure zone 102 must go through a relay computer 120. The air gap 104 can be implemented with a physical wire that flips between one of two configurations, as shown: relay server 120 connected to HSM(s) 130, and relay server 120 connected to external internet (e.g., through online server 110). There is no configuration that allows HSM(s) 130 to be directly connected to the external internet. Other ways to implement a half-duplex relay server include the use of virtual private networks and other software implementations, as well as manual (human) airgapping and switching.

Thus, the air gap 104 is effected by each relay computer 120 disconnecting from any network outside the CCS 100 when communicating with any HSM 130 within the secure zone 102. Further details regarding such an air gap mechanism are described below. Other air gap mechanisms are possible, including using multiple relay computers 120. For example, each of multiple relay server computers 120 can have its own associated air gap 104 to create its own secure zone 102, and each such relay server computer 120 can be connected to more than one HSM host computer, and each HSM host computer can be connected to multiple HSMs 130. Note that more than one HSM 130 within a secure zone 102 can share a hardware-based cryptographic key 138 to facilitate load balancing across multiple HSMs 130 within a secure zone 102. Moreover, in some implementations, no air gaps 104 are used.

The computer 120 can also include a proof-of-stake protocol program 126, which enables the computer 120 to perform some of the P2P processing and communicating needed to effect the proof-of-stake protocol for the blockchain network 156, 156A. Moreover, in some implementations, the computer 120 includes an air-gap timing control program 128, and/or the computer 110 includes an air-gap timing control program 118, which enables control of the air gap 104 to accommodate different timing required for different staking and governance protocols. Moreover, in addition to different proof-of-stake protocols, the CCS 100 can be designed to handle other types of staking and governance protocols. In some implementations, the CCS 100 also handles one or more delegated proof-of-stake protocols.

In order for the request 164A to be granted, a digital signature must be obtained using a private key PK of an asymmetric cryptographic key pair, where the private key PK is usable to control ownership of the cryptoasset CA recorded in the blockchain 156. But because the cryptoasset CA is in a custodial account, the private key PK is securely held in the CCS 110, and the private key PK is only accessible within an HSM 130. The private key PK cannot leave the secure zone 102. Thus, in order to grant the request 164A, at least a portion of the proof-of-stake protocol must be performed in the HSM 130. Note that other portions (as well as the same portion) of the proof-of-stake protocol can be performed in other computers 110, 120 of the CCS 100. In some implementations, the portion of the proof-of-stake protocol performed by the HSM 130 can be a reconfirmation of an aspect of the staking operation that has been confirmed in one or more of the computers 110, 120 of the CCS 100. For example, the HSM 130 can perform a revalidation of the staking transaction 164D, i.e., the HSM 130 can revalidate that the staking message/request is in a format that conforms to the proof-of-stake protocol.

The HSM 130 includes at least one physical computing device 132, which includes cryptographic processing logic 134 (circuitry and/or code, e.g., firmware) that manages private keys of asymmetric cryptographic key pairs usable to control access to one or more blockchains, such as the blockchain 156. The HSM 130 also includes at least one secure storage device 136 coupled with the physical computing device 132. In some embodiments, the secure storage device 136 is coupled with the physical computing device 132 by being integrated therewith. For example, the secure storage device 136 can be a non-volatile memory device included in an integrated circuit chip including the physical computing device 132, and the cryptographic processing logic 134 can be cryptographic processing code stored in (and potentially run directly from) the secure non-volatile memory device 136.

In addition, the cryptographic processing logic 134 includes staking logic 134A that is designed for the proof-of-stake protocol, thus enabling the HSM 130 to authorize the staking operation 164B responsive to the request 164A by digitally signing a staking transaction 164C associated with the staking operation 164B. Thus, any critical staking code handling key material can be run within the HSM secure boundary with secure hardware, encrypted memory, etc. As will be appreciated each staking operation 164B can include one or more staking transactions 164C. In other cases, more than one staking operation 164B can share a staking transaction 164C, such as when a single, digitally signed staking request 164C can pre-approve multiple staking operations 164B for a period of time.

In some implementations, before the staking operation 164B can be authorized, a check is made to confirm that the request 164A itself is authorized. For example, the logic 134, 134A can confirm client authorization provided in cryptographic form, such as by confirming a quorum of digital signatures from hardware keys in mobile devices 172 and/or using vault based policies, e.g., as described in detail below. In addition, different staking protocols can be handled in the HSM 130 using the logic 134A, including delegated proof-of-stake protocols. Thus, in addition to using a private key to lock a cryptoasset into a validator node's stake, the private key can be used to vote for a delegate that can be selected to validate the next block.

The digitally signed staking transaction (or request) 164C can then be sent to another computer to effect the staking operation 164B on behalf of the user 170. For example, a digitally signed staking transaction 164D can be communicated from the HSM 130 to the relay computer 120, where the digitally signed staking transaction 164D is potentially further processed by the proof-of-stake protocol program 126 before being communicated by relay server program 124 to the online computer 110, where the digitally signed staking transaction 164D is potentially further processed by the proof-of-stake protocol program 116 before being communicated by online server program 114 to the full node 160A. The full node 160A receives the digitally signed staking transaction 164D (potentially wrapped in other data for the staking operation 164B) and, in this example, this causes addition of the cryptoasset CA to the stake 162A.

With this addition to the stake 162A of the node 160A, the chances that the full node 160A will be selected to validate new blocks for the blockchain network 156, 156A will be increased. The full node 160A validates a new block 159 for the blockchain 156A by checking if transactions in the block 159 are valid, digitally sign the block 159, and adding the block 159 to the blockchain 156A. When the new block 159 is accepted in the blockchain network, the full node 160A receives transaction fees associated with the transactions in the block 159 as a reward for doing the validation, e.g., the full node 160A can receive new cryptoassets created in the blockchain network 156, 156A. These transaction fees can then be shared with the owners of the cryptoassets in the stake 162A, including the owner of the cryptoasset CA.

Figure 1B:
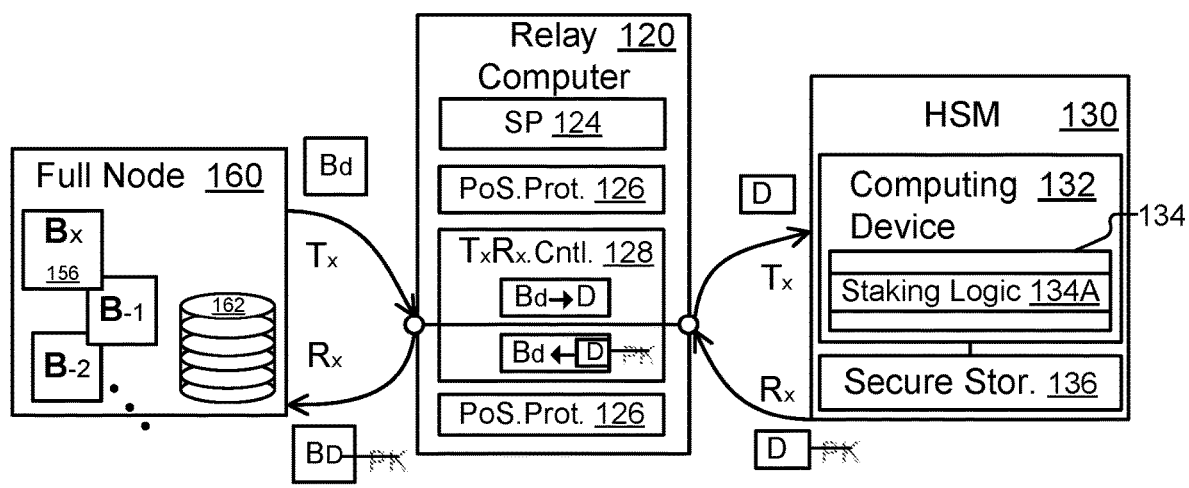
FIG. 1B is a schematic diagram showing an example of dataflow through a half-duplex connection between a hardware security module (HSM) in the CCS of FIG. 1A and a full validating node of the proof-of-stake distributed ledger system.

FIG. 1B is a schematic diagram showing an example of dataflow through a half-duplex connection between an HSM 130 and a full validating node 160 of the proof-of-stake distributed ledger system. When the air gap 104 is switched to allow full duplex transmission ($T_xR_x$) between the relay computer 120 and the full node 160 through server program (SP) 124, Blockchain data Ba is transferred to the relay computer 120 and processed by proof-of-stake protocol (PoS.Prot.) program 126 using TxRx control (Cntl.) logic 128 to generate data D. When the air gap 104 is switched to allow full duplex transmission ($T_xR_x$) between the relay computer 120 and the HSM 130, data D data is transferred to the HSM 130 and processed in computing device 132 using staking logic 134A (circuitry and/or code, e.g., firmware) to generate digitally signed data $D^{PK}$. Then, when the air gap 104 is switched to allow full duplex transmission ($T_xR_x$) between the relay computer 120 and the full node 160 through SP 124, digitally signed data $D^{PK}$ is processed by PoS.Prot. program 126 using TxRx Cntl. logic 128 to generate digitally signed Blockchain data $B_D^{PK}$, and the digitally signed Blockchain data $B_D^{PK}$ is transferred to the full node 160. Thus, the "connection" between the HSM 130 and the full validating node 160 is half-duplex in that messages cannot travel between these two endpoints in both directions concurrently.

In addition, the CSS 100 can employ a cryptoasset agnostic authorization layer, which uses one or more layers of key indirection. Customer account keys, e.g., an organization's private keys or cryptographic keys 332, as described further below, can be used to obtain cryptoasset private keys such as the private key PK, which is usable to control ownership of the cryptoasset CA recorded in the blockchain 156. One or more layers of encryption can be used to protect confidential information, including a private key, such as the private key PK or an organization's private key used to obtain the private key PK, and at least one of the encryption layers can require a hardware-based cryptographic key 138 in the HSM 130 (as shown in FIG. 1A) to be used to fully decrypt the confidential information. Further details for multi-layer encryption are included below and in U.S. application Ser. No. 16/276,567, filed on Feb. 14, 2019, and titled "CRYPTOASSET CUSTODIAL SYSTEM WITH DIFFERENT CRYPTOGRAPHIC KEYS CONTROLLING ACCESS TO SEPARATE GROUPS OF PRIVATE KEYS", which application is hereby incorporated by reference in its entirety.

In addition, as noted above, more than one HSM 130 can share a hardware-based cryptographic key 138, which improves hardware processing availability (e.g., multiple different HSMs can be used for any given request) and facilitates rebalancing of the cryptoassets held in the CCS 100. In any case, a hardware-based cryptographic key 138 is required to get clear access to the private key PK. Moreover, one or more key derivation functions (KDFs) can be used to derive the private keys to the cryptoassets, such that those private keys need not be explicitly stored in the HSM 130, but rather can be implicitly held therein. The KDF allows the private keys to be regenerated based on input provided to the HSM 130, e.g., an organization private key or a cryptographic key 332, such as described in detail below in connection with FIG. 3A. Thus, the HSM 130 need not physically store any private keys at all, but is nonetheless able to recreate the private keys using the deterministic algorithm of the KDF.

In addition, note that the KDF algorithm can be changed for new cryptoasset keys, e.g., for new private keys created for a migration of cryptoassets as a security measure. In the unlikely event of an HSM master key compromise, the cryptoassets protected by that key would be moved to new private keys, derived under a new HSM master key or different scheme. If the KDF was discovered to be somehow not cryptographically sound, a similar procedure can be performed or a new KDF scheme can be used for all new keys if the existing keys are still usable.

Figure 2A:
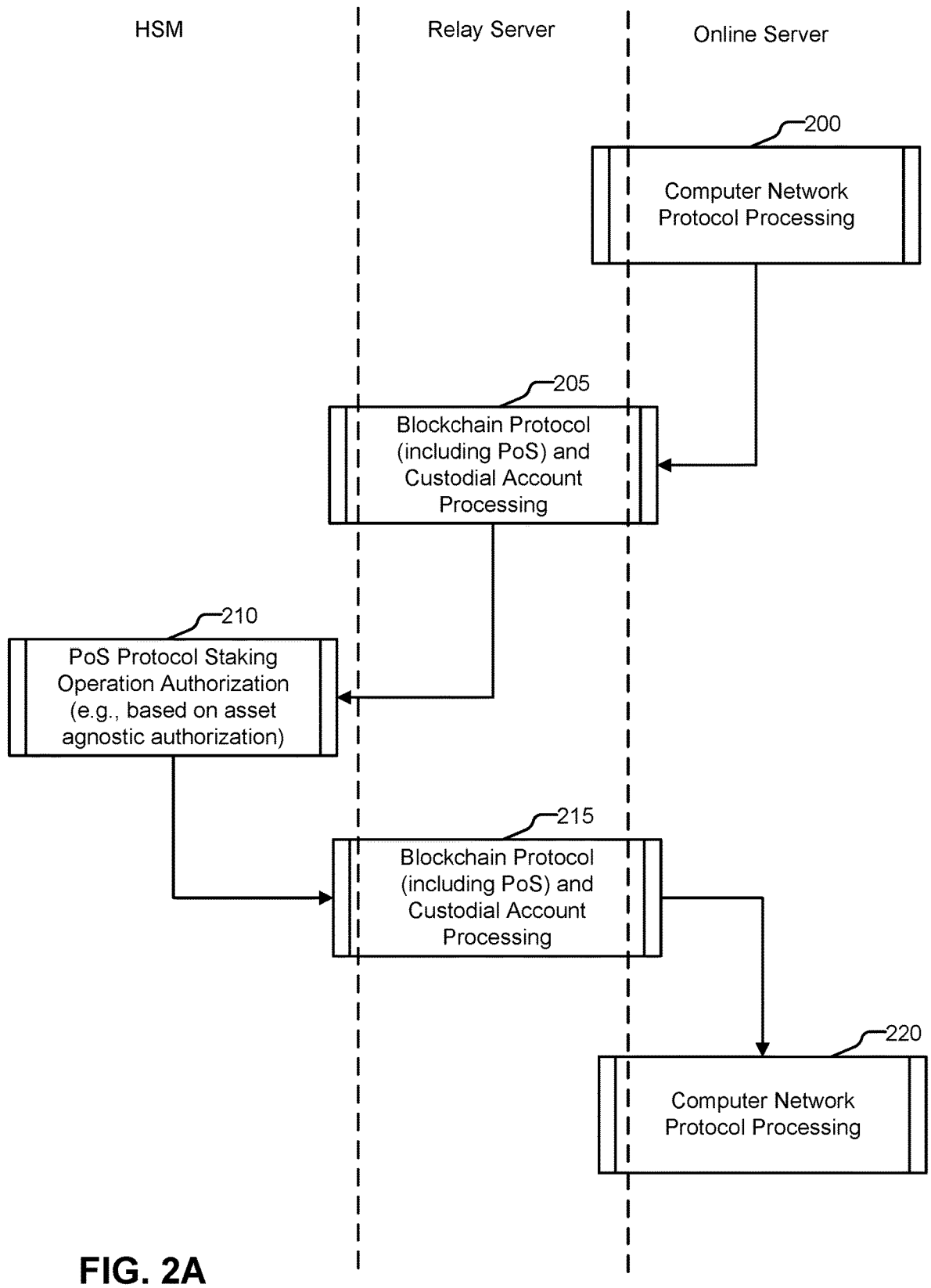
FIG. 2A is a flow diagram showing an example of protocol processing, including proof-of-stake protocol processing, in a CCS.

FIG. 2A is a flow diagram showing an example of protocol processing, including proof-of-stake protocol processing, in a CCS. An online server performs computer network protocol processing 200 using known networking processes in addition to the systems and techniques described in this application. As part of this processing 200, a request to authorize a staking operation for a proof-of-stake protocol associated with a blockchain can be received 200 by the online server, and after any needed appropriate processing by the online server, this request can be sent to a relay server. The relay server performs blockchain protocol processing 205, including proof-of-stake (PoS) protocol processing, using known processes in addition to the systems and techniques described in this application, and also any appropriate custodial account processing 205. Thus, the relay server can receive the request to authorize the staking operation from the online server (or another computer within the CCS) and perform initial protocol processing to get the request ready for authorization in the HSM.

As shown in FIG. 2A, there is not a hard separation between these different protocol processing operations. In some implementations, at least a portion of the network protocol processing 200 is performed by the relay server. In some implementations, at least a portion of the blockchain protocol processing 205 is performed by the online server. Similarly, at least some of the blockchain protocol processing 205 can be performed in the HSM. The amount of protocol processing performed by the HSM versus another computer (e.g., the online server and/or the relay server) can be specific to the blockchain and staking protocol, and the HSM can perform a portion of the protocol process that is also performed elsewhere.

However, in general, it is preferable to reduce the amount of blockchain protocol processing 205 performed by the HSM to maximize HSM availability for secure authorization of staking and governance protocols for digital assets. At a minimum, the HSM will digitally sign staking transactions to authorize staking operations after confirming or reconfirming an aspect of the staking operation (e.g., the HSM revalidates that the staking messages/requests are in the proper format for the proof-of-stake protocol), and the various HSMs in the CCS will be kept sufficiently available in order to participate at the appropriate frequency required by the staking protocol. Thus, key security is maintained by the HSMs (e.g., put the most critical code in the HSM to avoid losing stake) while also providing high availability for participating in staking and governance.

The HSM receives the request to authorize the staking operation from the relay server and performs PoS protocol staking operation authorization 210 using the systems and techniques described in this application. For example, the HSM can perform asset agnostic authorization 210 as described in further detail below in connection with FIG. 2C. In some implementations, the HSMs of the CCS 100 run custom firmware to support staking and governance operations. This firmware can be customized per asset type, as each protocol may differ. However, every protocol action should be authenticated and authorized, e.g., by client signatures. In addition, to verifying that clients approved the action, depending on the protocol, the clients can pre-approve a continued use of the staking action (e.g., by policy update, as described below) especially for protocols that require operations on a very frequent basis; when more frequent signatures are required by the staking protocol, the use of pre-approval in the policy map for certain actions and/or for certain time frames can reduce the number of endorsement messages that will be needed. The verification can be done inside of the HSM firmware to ensure all actions are authorized prior to accessing asset keys, but can also be replicated in other parts of the system for defense in depth. Additional checks that rely on real-time state of the blockchain can occur outside of the HSM when the HSM is air-gapped.

After the staking operation has been authorized 210 by the HSM, the relay server performs any additional needed blockchain protocol processing 215 (including PoS protocol processing) and also any appropriate custodial account processing 215. As before, some of this processing 215 can be performed by the HSM and/or the online server. In any case, the digitally signed transaction (message, request, etc.) authorizing the staking operation is sent from the HSM to the relay server and then (after any appropriate processing) from the relay server to the online server, which in turn performs computer network protocol processing 220 to effect the staking operation on behalf of the user of the CCS.

Figure 2B:
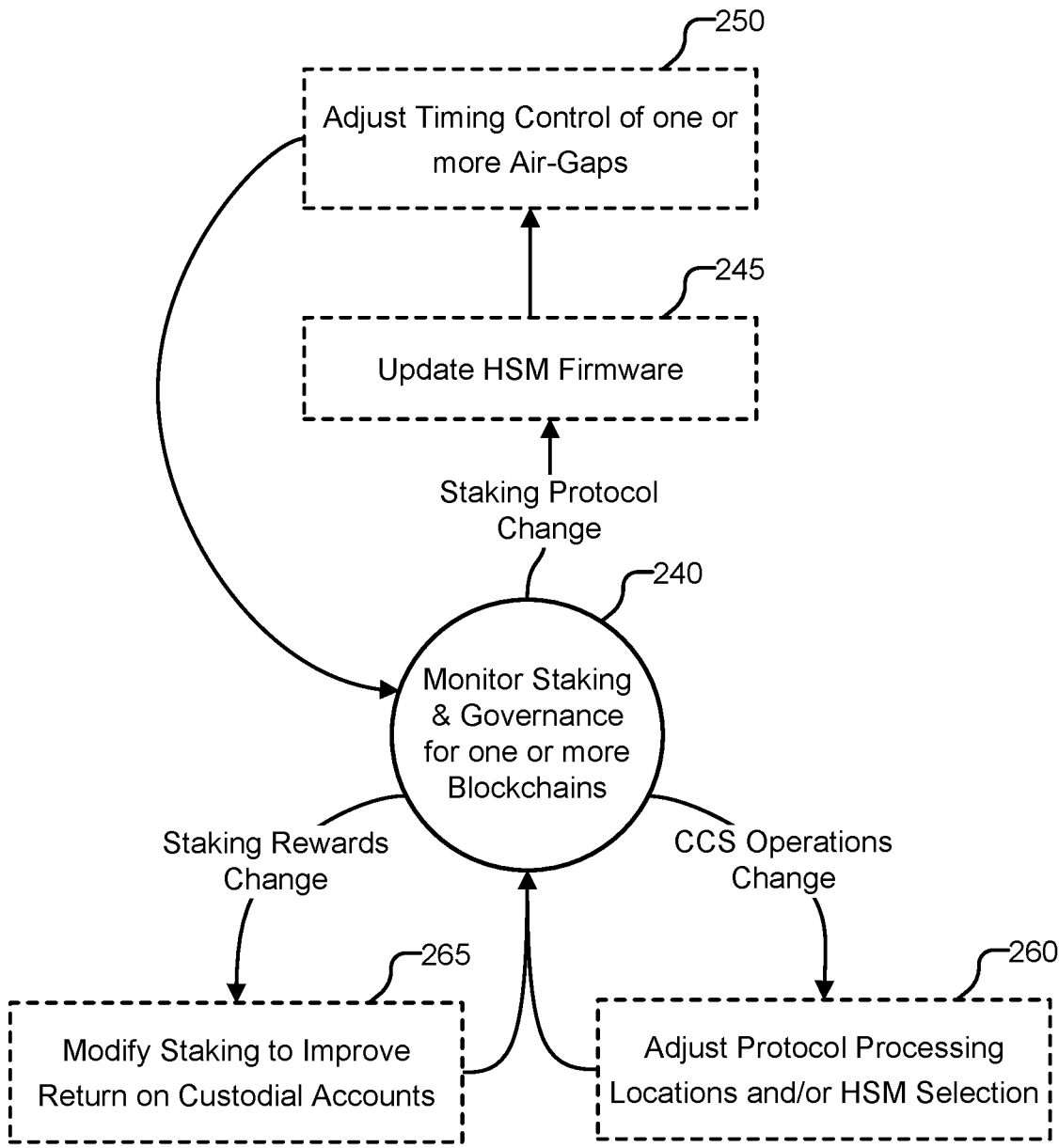
FIG. 2B is a state and flow diagram showing an example of modifying operations in a CCS in response to changes related to staking and governance.

FIG. 2B is a state and flow diagram showing an example of modifying operations in a CCS in response to changes related to staking and governance. A challenge of staking and governance operations is that keys must be kept sufficiently available; depending on the protocol, an asset key may need to sign off on staking messages multiple times within a day or hour. Note that while the HSMs are air-gapped, they are able to communicate with a relay server which is disconnected and reconnected between the HSMs and the company's cloud systems at a frequent rate (e.g., one per minute). This rate can be customized and modulated to coordinate optimally with frequency of staking and governance operations. Thus, in some implementations, the CCS monitors 240 staking and governance for one or more blockchains, and when there is a staking protocol change (e.g., a change to an existing staking protocol or the creation of a new staking protocol) the timing control of one or more air gaps in the CC can be adjusted 250 accordingly. For example, the air-gap switch rate can be changed from once ever sixty seconds (applicable to most current staking protocols) to once per day or a less frequent basis (applicable to some existing protocols). Note that the air-gap switching rate can be adjusted 250 according to the protocol, which provides added flexibility in the CCS, both for handling multiple current staking and governance protocols and for accommodating future developments in staking and governance protocols.

Moreover, the HSM logic that handles the portion of the staking and governance protocols that requires digital signature by the cryptoasset private key can be firmware code programmed to handle different staking transactions for one or more proof-of-stake protocols. Thus, by not using hard-coded circuitry, the HSMs can be readily updated as well. Therefore, in response to a staking protocol change (e.g., a change to an existing staking protocol or the creation of a new staking protocol) the firmware in one or more HSMs can also be updated 245 to accommodate the change. This change can involve the specifics of the operations that the HSMs perform, as well as how much of the protocol is performed on the HSM versus in other computers in the CCS.

Similar changes can also be made in response to a change in CCS operations. Thus, protocol processing locations and/or HSM selection can be adjusted 260 in response to changes in the CCS system. Note that performing addition portions of the staking and governance protocols in various computers with the CCS (e.g., in the relay server computers or the online server computers or other computers) can help balance processing loads within the CCS and/or increase security (e.g., by doing redundant processing in various computers of the CCS as a double or triple check). Further, HSM selection can be adjusted by rebalancing private-keys groups, as described in U.S. application Ser. No. 16/276, 567, filed on Feb. 14, 2019, and titled "CRYPTOASSET CUSTODIAL SYSTEM WITH DIFFERENT CRYPTOGRAPHIC KEYS CONTROLLING ACCESS TO SEPARATE GROUPS OF PRIVATE KEYS", which application is hereby incorporated by reference in its entirety.

Moreover, in the event that the rewards for staking change (e.g., a new staking protocol offers a higher rate of return, or one validator (forger) is likely to be selected more often than another for block validation) the CCS can modify 265 the staking being performed with the cryptoassets to improve the return on the custodial accounts. In some embodiments, pre-approval of staking operations allows the CCS to monitor 240 one or more blockchain networks to identify the best staking opportunities for the customers of the CCS and thus improve the rewards provided to owners of the staked cryptoassets.

Figure 2C:
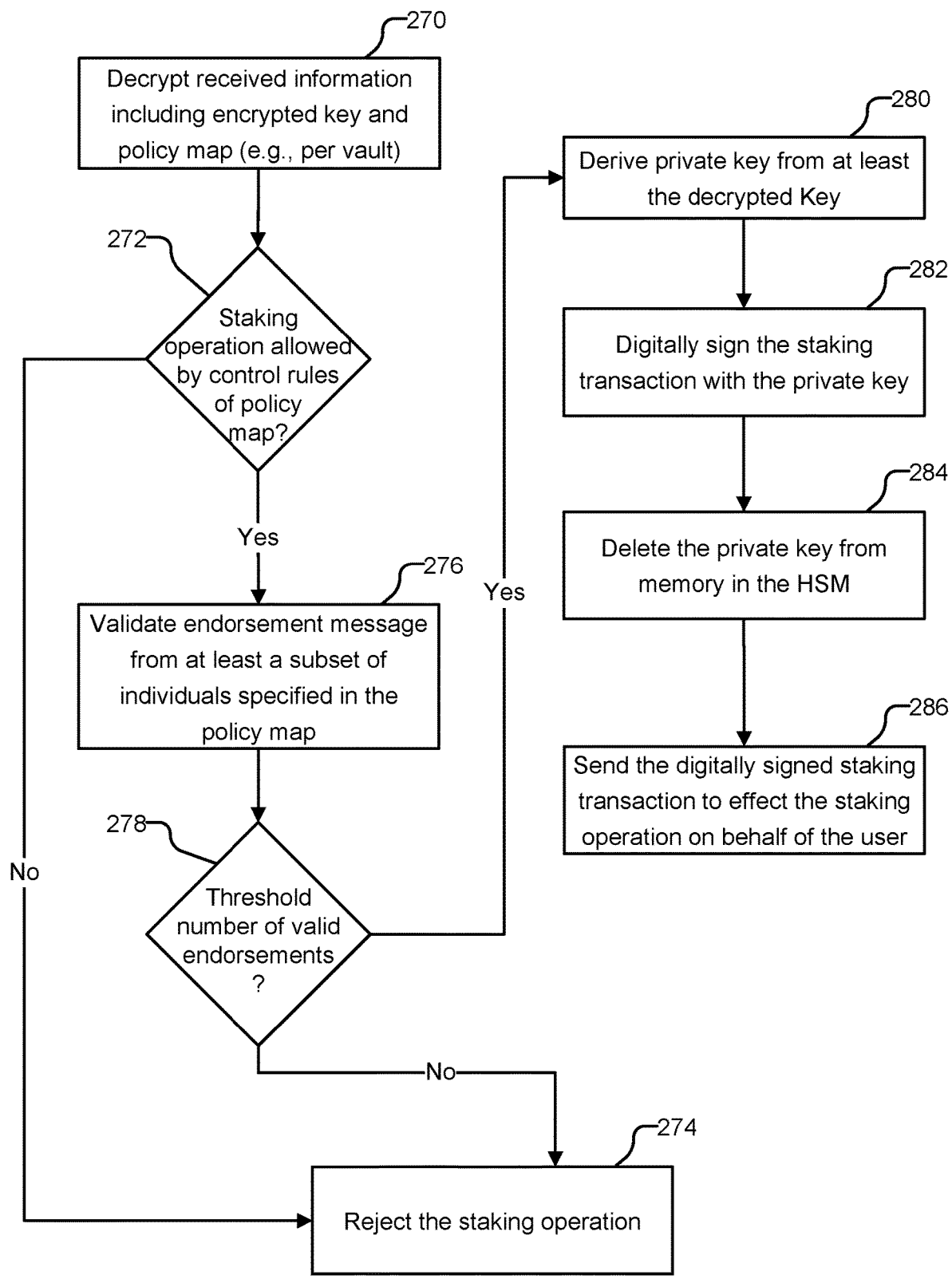
FIG. 2C is a flow diagram showing an example of proof-of-stake (PoS) staking request approval in an HSM.

To improve security, the system and techniques described above can be used with cryptoasset vaults, as described in detail below, and/or the CSS 100 can use endorsement messages in a cryptoasset agnostic authorization layer for user authorization of transactions, as also described in detail below, e.g., based on risk analysis, to further enhance security and increase robustness of the CCS 100 in the face of changing distributed ledger and blockchain technologies. FIG. 2C is a flow diagram showing an example of proof-of-stake operation approval in an HSM. The HSM receives information and decrypts 270 at least a portion of this received information. The received information includes a policy map, e.g., a policy map with access control rules specific to a particular vault, and an encrypted key.

For example, the HSM (or set of HSMs) that hold the private (asset) key can also be the HSM (or set of HSMs) that generated a private (organization signing) key for the customer custodial account holding the private (asset) key. The HSM(s) can produce keys for a provisional Organization data structure by generating a random digital signature public/private key pair (VerificationKey$_{org}$ and SigningKey$_{org}$) and then encrypt the private key (SigningKey$_{org}$) with a hardware-based cryptographic key (the HSM's own in-hardware master key, e.g., key 322 in FIG. 3A) to produce ENC(SigningKey$_{org}$)$_{HSM}$. The HSM can also digitally sign some aspect of the customer account record with the private (organization signing) key (e.g., key 332 in FIG. 3A) such as by digitally signing the complete Organization data structure with SigningKey$_{org}$ to produce OrgSignature, before discarding all this information, including the plaintext SigningKey$_{org}$, from its memory. These operations can occur well before the staking request is received.

Thus, in the present example, the received information by the HSM includes Organization, OrgSignature, Asset ID, Vault ID, VerificationKey$_{org}$ and ENC(SigningKey$_{org}$)$_{HSM}$ (note that additional layers of encryption can be used for the organization's signing key, e.g., a cryptographic group key), and the decrypting 270 involves the HSM using its hardware-based cryptographic key to reveal the decrypted private key (SigningKey$_{org}$). Note that the fully decrypted private (organization signing) key is only available inside the HSM hardware itself, as discussed in further detail below. Also note that the VerificationKey$_{org}$ need not be sent to the HSM when the HSM can derive VerificationKey$_{org}$ from the cleartext SigningKey$_{org}$, but in some embodiments, the VerificationKey$_{org}$ is also received by the HSM.

The information received by the HSM in this example also includes endorsements and a policy map. The policy map can be included in the Organization data structure and can be specific to the Vault ID. The endorsements can also be received by the HSM at the same time or be actively requested by the HSM. In practice, it is generally preferable to have the relay server computer collect and provide to the HSM (e.g., during one switch of the air gap) all the information needed for a given authorization process to proceed in the HSM.

In any case, the result of the decrypting 270 is a decrypted key, e.g., the cleartext SigningKey$_{org}$. In addition, the process can include verification 272 of one or more policy maps, e.g., verifying the OrgSignature of the Organization using the VerificationKey$_{org}$, and checking 272 whether or not the control rules of the policy map allow the requested staking operation. If not, the staking operation is rejected 274. Further, details regarding verifying policy maps for one or more vaults are provided below in connection with FIG. 3A.

In addition, the HSM can validate 276 the received endorsement messages from individual users of the cryptoasset custodial system (as specified by the policy map) by checking cryptographic digital signatures using public keys corresponding to the specified individual users (e.g., firmware running in the HSM can verify digital signatures generated by hardware-based private keys residing on mobile devices of the users). If a threshold number (as set by the policy map) of valid endorsement messages are not confirmed 278, the staking operation is rejected 274. Note however that, in some embodiments, the relay server computer has already performed both checks 272, 278, and thus the chances that the HSM will reject the staking operation are extremely low, as the policy may has already been checked and the endorsement message have already been validated by the relay server computer.

In addition, the threshold number for the check 278 (i.e., the required quorum size) can be based on the specific staking protocol, the specific staking operation to be approved and/or the size of the stake, as detailed in the policy map, as well as being dependent on a risk assessment (e.g., by risk analysis stage 4 described below). When both checks 272, 278 are cleared, the private key for the cryptoasset is derived 280 from at least the decrypted key. For example, the cleartext SigningKey$_{org}$ and the Asset ID can be provided as input to a KDF to regenerate as output the private key for the cryptoasset. Other inputs to the KDF can include the Vault ID, as described in further detail below in connection with FIG. 3A, when the cryptoasset has been assigned to one of multiple different vaults in the CCS. The staking transaction is then digitally signed 282 with the regenerated private key produced in the HSM. The regenerated private key is deleted 284 from memory in the HSM, and the digitally signed staking transaction is sent 286 to the relay server computer to effect the staking operation on behalf of the user.

Vaults System for HSM

Figure 3A:
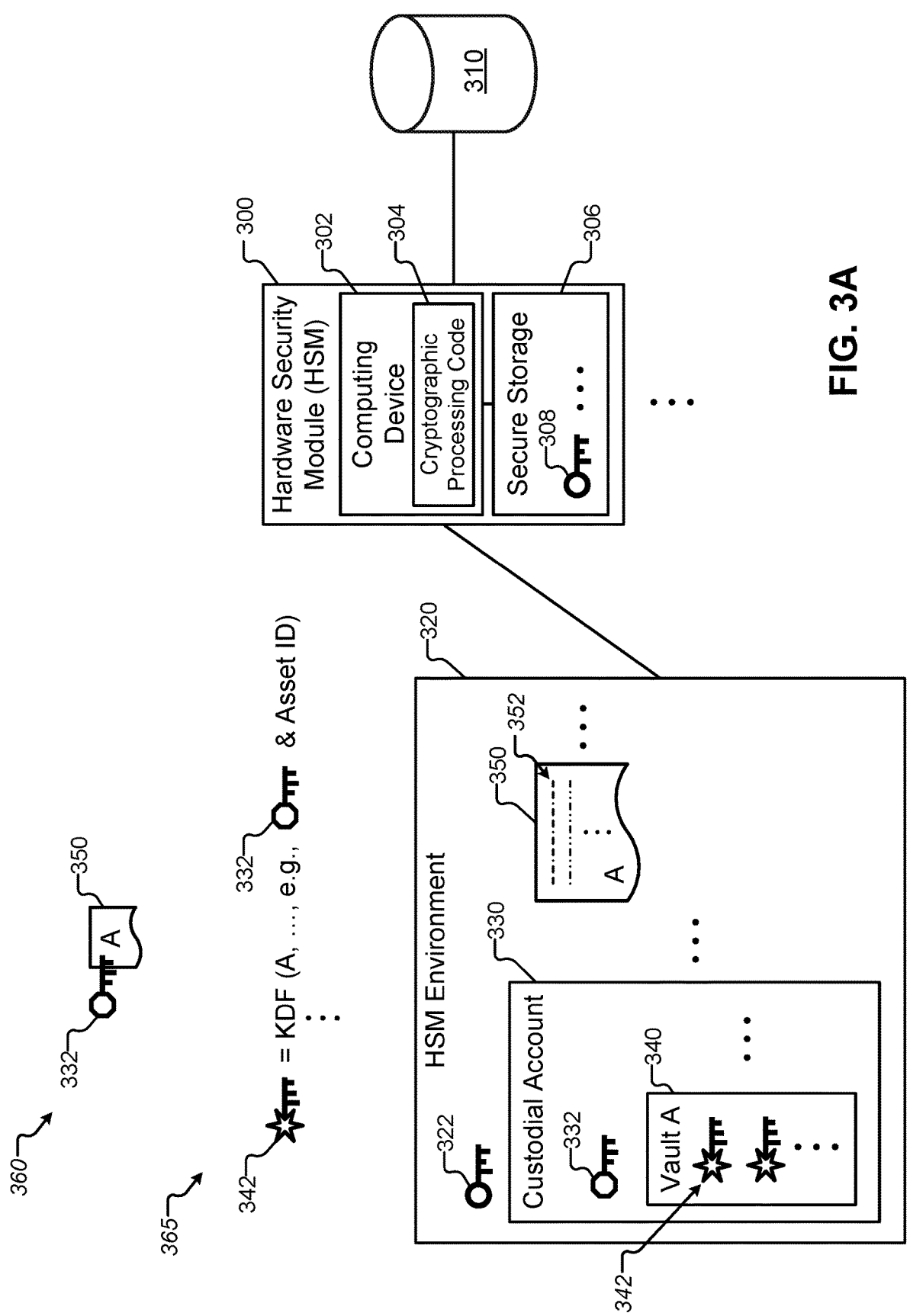
FIG. 3A is a schematic diagram showing an example of a structure of access rules enforced by an HSM.

As noted above, a vaults system can be used in the CCS 100. FIG. 3A is a schematic diagram showing an example of a structure of access rules enforced by an HSM 300. The HSM 300 includes at least one physical computing device 302, which executes cryptographic processing code 304 that manages private keys of asymmetric cryptographic key pairs usable to control access to cryptoassets in at least one blockchain. The HSM 300 also includes at least one secure storage device 306 coupled with the physical computing device 302. In some embodiments, the secure storage device 306 is coupled with the physical computing device 302 by being integrated therewith. For example, the secure storage device 306 can be a non-volatile memory device included in an integrated circuit chip including the physical computing device 302, and the cryptographic processing code 304 can be stored in (and potentially run directly from) the secure non-volatile memory device 306.

In some embodiments, the physical computing device(s) 302 and the secure storage device(s) 306 of the HSM 300 are implemented as a Secure Execution Environment (SEE), where the code 304 cannot be changed except through physical access to the HSM 300, and any change to the code 304 requires a set of smartcards held securely by multiple employees of the Cryptoasset Custodian. In some embodiments, a general signed code check is used to ensure the security of the cryptographic processing code 304. Further, in some embodiments, the HSM has access to a database 310. The database 310 can be included in the secure storage device(s) 306 or be hosted on a separate computing system, such as a server computer coupled with the HSM 300 through a computer network.

The secure storage device 306 stores one or more cryptographic keys 308 that are controlled by the HSM 300. At a minimum, the HSM 300 can have a single master key 308 that never leaves the HSM 300. In such embodiments, the master key 308 is used to encrypt and decrypt all sensitive data (including other cryptographic keys) so that this data can be securely stored in the database 310 on another computer system, but this secured data cannot be decrypted except in the HSM 300 as the master key 308 stays within the HSM 300. The one or more cryptographic keys 308 can be one or more symmetric cryptographic keys and/or one or more asymmetric cryptographic key pairs, where each key pair has a public key and a private key, which are usable for digital signature processing.

The HSM 300 provides an HSM environment 320 in which cryptographic processing code 304 operates on multiple cryptographic keys to control access to cryptoassets that are managed by the CCS. The HSM 300 can provide cryptographic processing for one or more custodial accounts 330, each account 330 being for one or more customers of the Cryptoasset Custodian. Each account 330 includes two or more vaults 340, where each vault 340 includes multiple private keys 342 useable to access cryptoassets. In some embodiments, the private keys 342 are derived (at least in part) from a Vault ID for each respective vault 340, which helps to enforce the logical separation of the private keys in the respective vaults, thus improving security in the CCS. In addition, each vault 340 has its own associated policy map 350, which defines vault control rules 352 governing which actions are allowed for the vault 340 under one or more specified conditions. The rules 352 of each policy map 350 can include quorum requirements, as described further below, as well as various other permission structures. Note that the policy maps 350 can be updated as well, and so the permission structure(s) and rule(s) therefor can be changed over time.

Each account 330 has an associated cryptographic key 332 that is encrypted by the HSM 300. The cryptographic key 332 is used to secure 360 each policy map 350 for each vault 340 in the associated account 330. In some embodiments, the cryptographic key 332 is a symmetric cryptographic key used by the HSM 300 to encrypt 360 each policy map 350, and the HSM 300 authenticates each policy map 350 by decrypting the policy map 350 using the cryptographic key 332. In some embodiments, the cryptographic key 332 is an asymmetric cryptographic key, where the private key portion of the key 332 is used by the HSM 300 to digitally sign 360 each policy map 350 when it is first created (or updated), and the HSM 300 authenticates each policy map 350 by confirming the digital signature of the policy map 350 using the public key portion of the key 332.

Regardless of the type of key 332, the HSM 300 only allows use of a private key 342 in a vault 340 when the requested action conforms to the rules set forth in the vault's associated policy map 350 and only when that policy map 350 has been authenticated by the HSM 300. When both conditions are met, the HSM will effect the requested action. In some cases, effecting the requested action involves digitally signing some data using the private key 342 (e.g., to effect a withdrawal of a cryptoasset). In some cases, effecting the requested action involves using the cryptographic key 332 (e.g., encrypting or digitally signing an updated policy map 350).

In some embodiments, the HSM 300 stores multiple cryptographic keys (e.g., all the cryptographic keys) that are kept secure by the HSM 300. Thus, the HSM 300 can store all the private keys 342 for each of the vaults 340. However, to reduce the amount of storage space required by the HSM 300, in some embodiments, a key derivation function (KDF) is used to derive 365 the private keys 342 on the fly, as they are needed. The KDF is a deterministic algorithm used to generate the private keys 342 in each respective vault 340 from respective unique identifiers for each vault 340. Thus, as shown, a key 342 is derived 365 using a KDF that takes vault ID "A" as input. Note that, regardless of whether or not the private keys 342 are generated only when needed (or stored), the process of using the Vault ID to derive the private keys 342 for each vault 340 forces the logical separation of the vaults 340 and ensures that private keys 342 cannot be shared between vaults 340. In addition, each cryptoasset in a vault can have one or more private keys 342 produced for that cryptoasset.

Moreover, the KDF can also use other information as input to help improve security in the CCS. For example, the KDF can use the cryptographic key 332 and the Asset ID as input, in addition to the Vault ID, as shown in FIG. 3A. Additional or different inputs can also be used with the KDF. Moreover, the HSM 300 and/or other HSMs in the CCS can each use different KDFs to further increase security in the CCS. Examples of KDFs that can be used include HKDF, PBKDF2, and scrypt. In general, a KDF takes input key material (e.g., an Organization key) and one or more deterministic identifiers (e.g., Vault ID and Asset ID). Further, in the case of on-the-fly creation of the private keys 342, as each private key 342 is regenerated for use in effecting an action (e.g., to digitally sign at least a portion of a request to withdraw a cryptoasset), once the action has been effected (e.g., sending resulting digital signature data to a blockchain network, either directly or through an intermediary) the private key 342 is deleted from memory entirely. Thus, the private keys 342 only exist in the HSM 300 for the times in which they are needed.

Further, one or more additional levels of key indirection can be used. For example, the HSM 300 can store its master cryptographic key 322, and when the cryptographic key 332 is first created by the HSM 300, this key 332 can be encrypted using the master key 322. This will allow the cryptographic key 332 to be stored (in encrypted form) in other computers and still remain secure, as the cryptographic key 332 can only be decrypted by the HSM 300 using its master key 322. Note that in some embodiments, the master key 322 is specific to the individual HSM, and in other embodiments, the master key 322 is shared among two or more HSMs (or potentially shared by all the HSMs) in the system to increase HSM availability for processing requests. Further, in some implementations, the cryptographic key 332 is a public-private key pair, only the private key 332 of the pair is encrypted with the master key 322, and the public key 332 of the pair is regenerated on the fly, as needed, from the decrypted private key 332 of the pair. Moreover, in some embodiments, a separate cryptographic key 332 is generated for each vault 340 in each custodial account 330 using the Vault ID to derive each respective cryptographic key 332, which forces the logical separation of the vaults 340 up to the level of the cryptographic key 332, and ensures that cryptographic keys 332 cannot be shared between vaults 340.

Additional Security Measures for the CCS

Figure 3B:
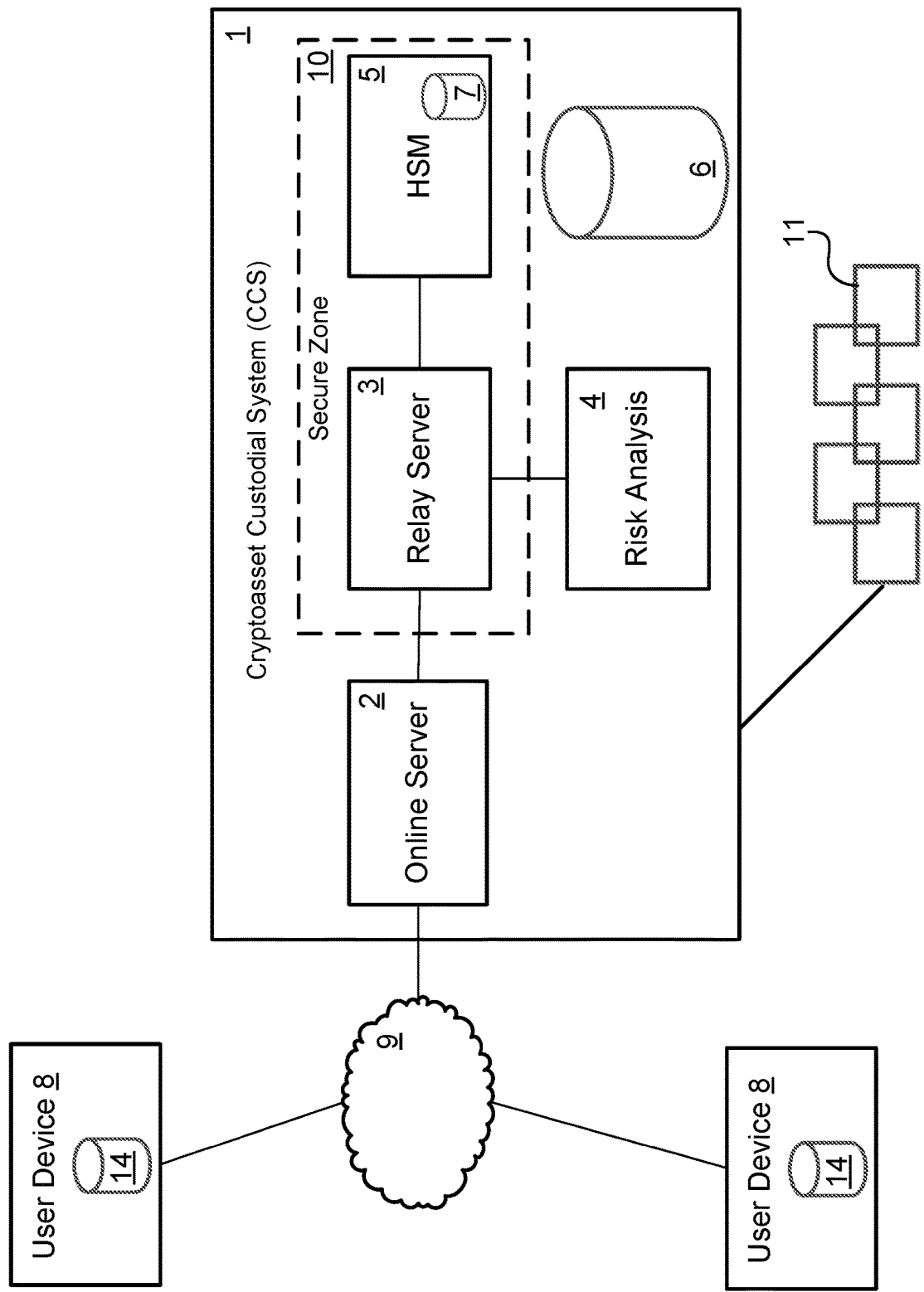
FIG. 3B is a block diagram showing another example of a CCS.

As noted above, the HSM 300 can be employed in a larger CCS, which can include additional HSMs and can employ additional systems and techniques to improve security. FIG. 3B shows a block diagram of an example of a CCS. In the shown embodiment, the CCS 1 includes an online server 2, a relay server 3, a risk analysis stage 4, an HSM 5, e.g., implemented as HSM 300, and a data storage facility 6. The data storage facility 6 may include one or more databases, e.g., database 310 or database 100, which can be or include relational databases or any other type of mechanism for storing data in an organized way, where the data may be structured data and/or unstructured data. The HSM 5 also includes its own internal secure storage facility 7, e.g., secure storage device 306. Note that there can be multiple instances of each of the above-mentioned components in the CCS 1, even though only one of each is shown to simplify description. One or more user devices 8, also called clients, can communicate with the CCS 1 via a public computer network 9, such as the Internet. Each of the user devices may be any one of, for example, a smartphone, tablet computer, laptop computer, desktop computer, or the like. Each user device 8 may include a secure enclave 14, such as an iOS-based secure enclave, which is used to store the corresponding user's private key and to generate digital signatures of that user. In at least some embodiments, each user device 8 is associated with a different user, and this description henceforth assumes such an embodiment to facilitate description. Note, however, that it is possible to have embodiments in which multiple users share the same user device 8.

The relay server 3 functions as a virtual air gap to isolate the HSM 5 from the public computer network 9. The relay server 3 and HSM 5 operate within a secure zone 10. The HSM 5 may physically reside in a physically secured datacenter with no direct access to any outside network. Messages between the HSM 5 and the online server 2 are routed on a half-duplex (outbound request-responses only) connection to the relay server 3 in the secure zone 10. The relay server 3 disconnects itself from the secure network while communicating with the online server 2, and disconnects itself from all external networks while communicating with the HSM 5, such that no interactive sessions with those devices can be established from the outside. This provides virtual air gap security to critical infrastructure. Moreover, in some implementations, the air gap is not just virtual, but is a physical air gap, e.g., a physical switch between the relay server 3 and any outside networks (e.g., the Internet) and/or a physical switch between the relay server 3 and the HSM 5, where each physical switch is driven by the relay server 3 or by a dedicated switching host.

In some embodiments, the CCS 1 also has access to at least one blockchain network 11 corresponding to cryptoassets of which the CCS 1 has custody. Access to the blockchain network 11 may be via the public computer network 9, e.g., the Internet.

In some embodiments, each transaction submitted by a customer of the CCS 1 will go through the risk analysis stage 4, which may be partially or fully automated. For example, with some embodiments of the CCS 1, a human risk analysis agent may evaluate the output of automated risk analysis software displayed on a risk review dashboard, to make a decision on whether a transaction has been sufficiently authorized to be accepted. The risk analysis agent or the software can follow a policy set on each individual vault and can look at any of various risk signals (e.g., the amount being transacted, how many users have authorized this transaction, the location(s) from which the transaction was requested and approved, the destination address) to compute a final risk score that might lead to the transaction being approved or more information being requested.

Deposits

Figure 4A:
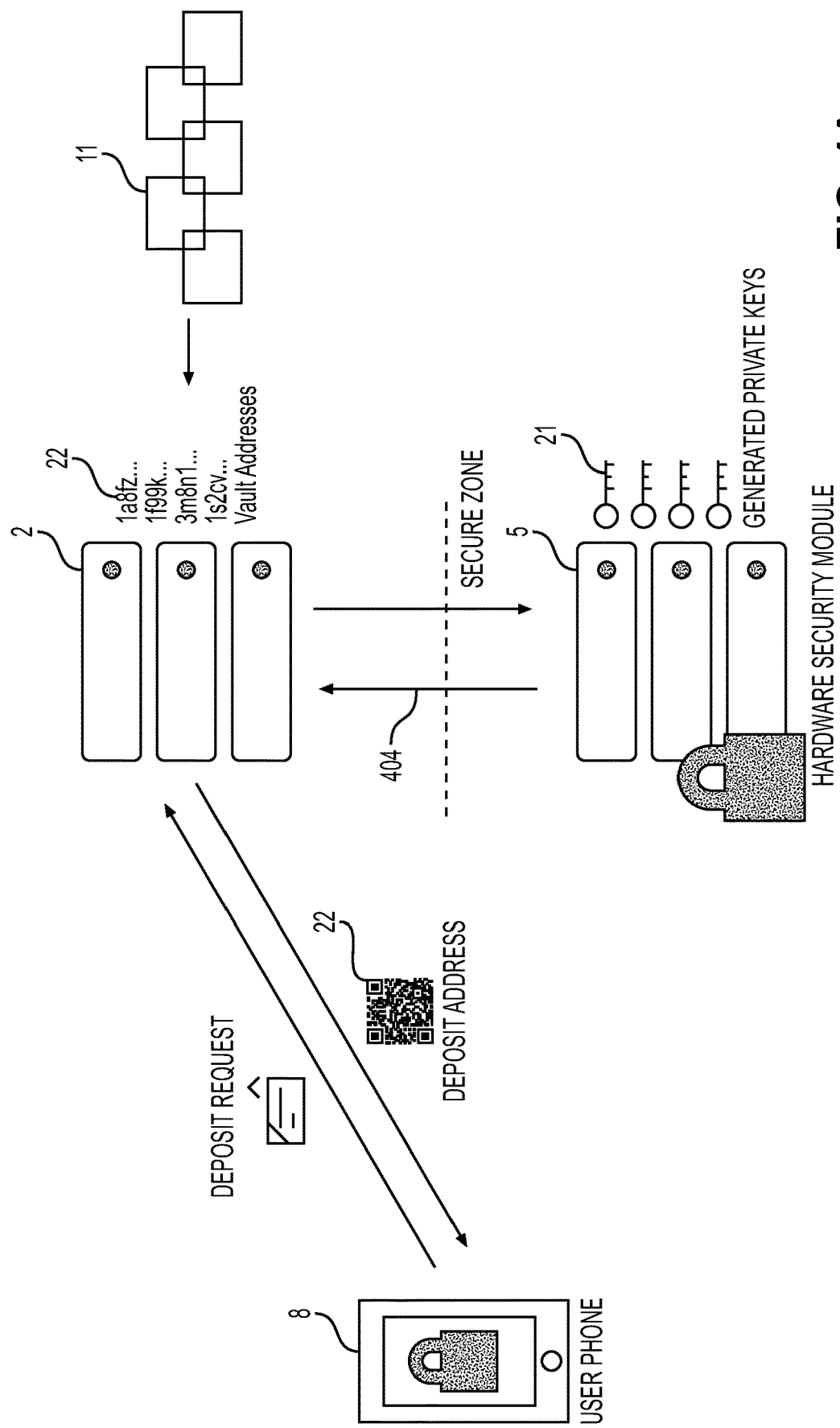
FIG. 4A is a schematic diagram showing an example of a deposit process flow with the CCS.
Figure 4B:
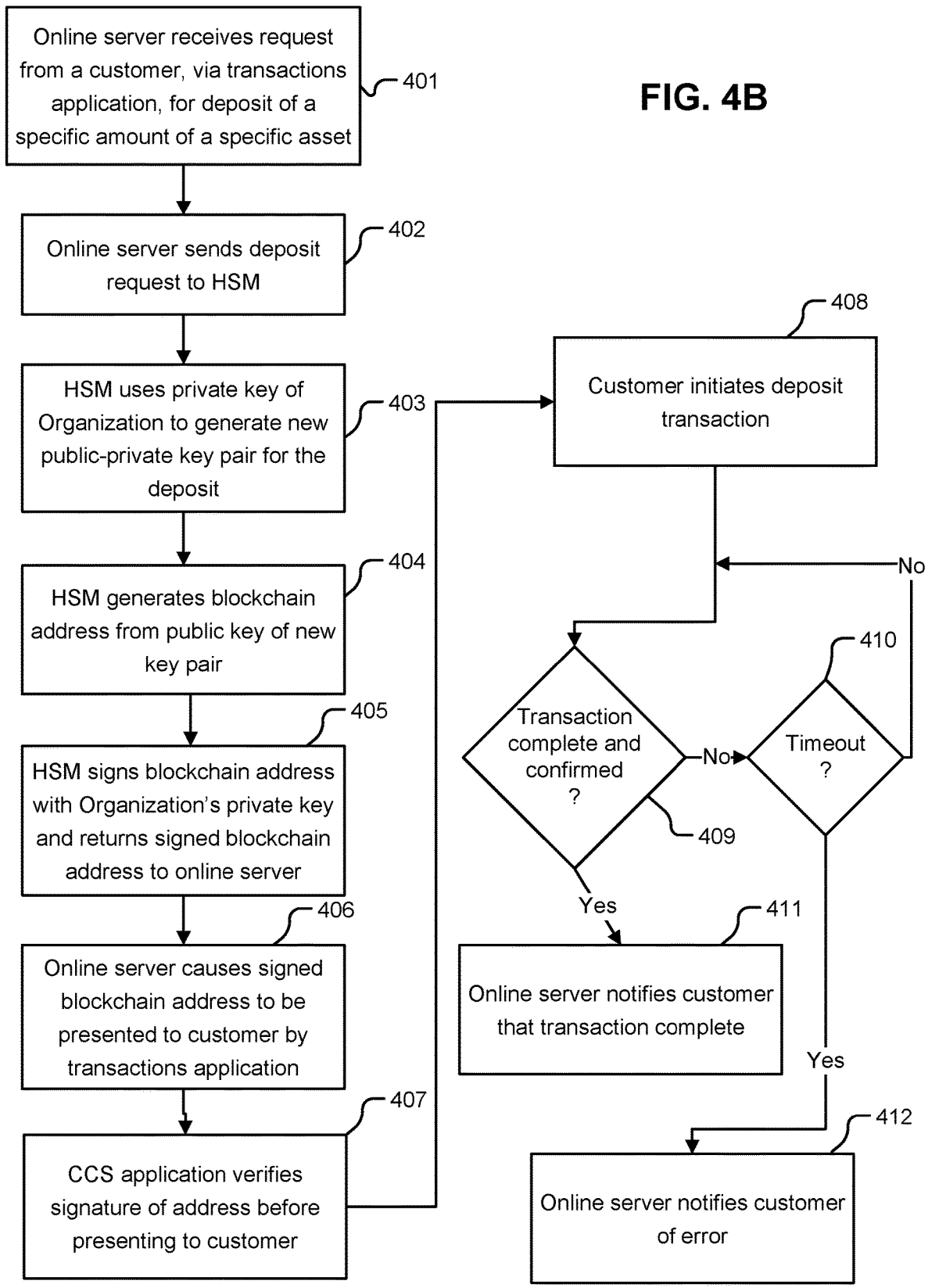
FIG. 4B is a flow diagram showing an example of the deposit process flow.

Refer now to FIGS. 4A and 4B, which show an example of the process of depositing a cryptoasset, such as an amount of cryptocurrencies, with the CCS 1. Deposits are initiated by a customer via the Internet through a software application (hereinafter "the CCS application") (not shown) executing on a user device 8 of the customer. This can be done by the customer's selecting an asset type and requesting a deposit for a given amount in the CCS application. Once initiated, the request for a blockchain deposit address is then sent to the online server 2, which receives 401 the request and forwards 402 it via the relay server 3 to the HSM 5 (which as noted above is isolated from the Internet by the relay server 3). The HSM 5 then generates 403 a new public-private key pair 21 to correspond uniquely with the deposit, i.e., to correspond with the requested blockchain address. In some embodiments, the HSM 5 uses the private key of the relevant Organization and a KDF to generate the new key pair for the blockchain address. An "Organization" in this context is a data structure that corresponds to a particular customer, as discussed herein. The private key of the newly generated key pair cannot be extracted from the HSM 5, but can be backed up securely in an encrypted file. Key generation inside the HSM 5 ensures that the private keys 21 only exist within the HSM 5, are not available anywhere else in the world and cannot be accessed by any entity that is external to the HSM 5.

The HSM 5 next generates 404 the blockchain address for the deposit from the public key of the newly-created key pair. This can be done by using a well-known blockchain-specific transformation of the public key of the blockchain address. The HSM 5 then signs 405 the blockchain address with the Organization's private key and returns the signed blockchain address to the online server 2. The online server 2 then causes 406 the signed blockchain address 22 to be sent to the customer's user device 8, to cause the user device 8 to present the address to the customer in the CCS application on a user device, in an easy-to-consume format (e.g., as a QR code), for use as a destination address in a blockchain transaction. The CCS application on the user device verifies 407 the signature of the address before presenting the address to customer.

The customer's user device 8 uses the public key of the Organization (which it previously received from the CCS 1 and locally stored) to verify the authenticity of the blockchain address it receives from the CCS 1. The customer then initiates 408 a transaction to deposit assets into the CCS 1. The transaction might be initiated from an exchange, from the customer's personal wallet, or from another cryptoasset store. No confirmation is required for the assets to show up in the CCS 1.

The address of the deposit is stored in a collection with other addresses belonging to the customer in the CCS 1, known as the customer's vault. A vault in this context is a data entity that contains assets and a policy map containing one or more policies governing deposits and withdrawals from those assets. A cryptoasset is represented as a slot inside a vault that can hold an amount of an asset type (e.g., Bitcoin, Ethereum). Once under custody and stored with the CCS 1, an asset is completely under the control of the CCS 1.

The online server 2 determines whether the customer has confirmed the transaction within the defined time period 409, 410. Once the deposit transaction is confirmed by customer and confirmed on the blockchain, the customer is so notified 411 by the online server 2, and the assets are considered to be under custody of the CCS 1. In the event confirmation is not received within the defined time period, the online server notifies 412 the customer of an error in the transaction.

Withdrawals

Figure 5A:
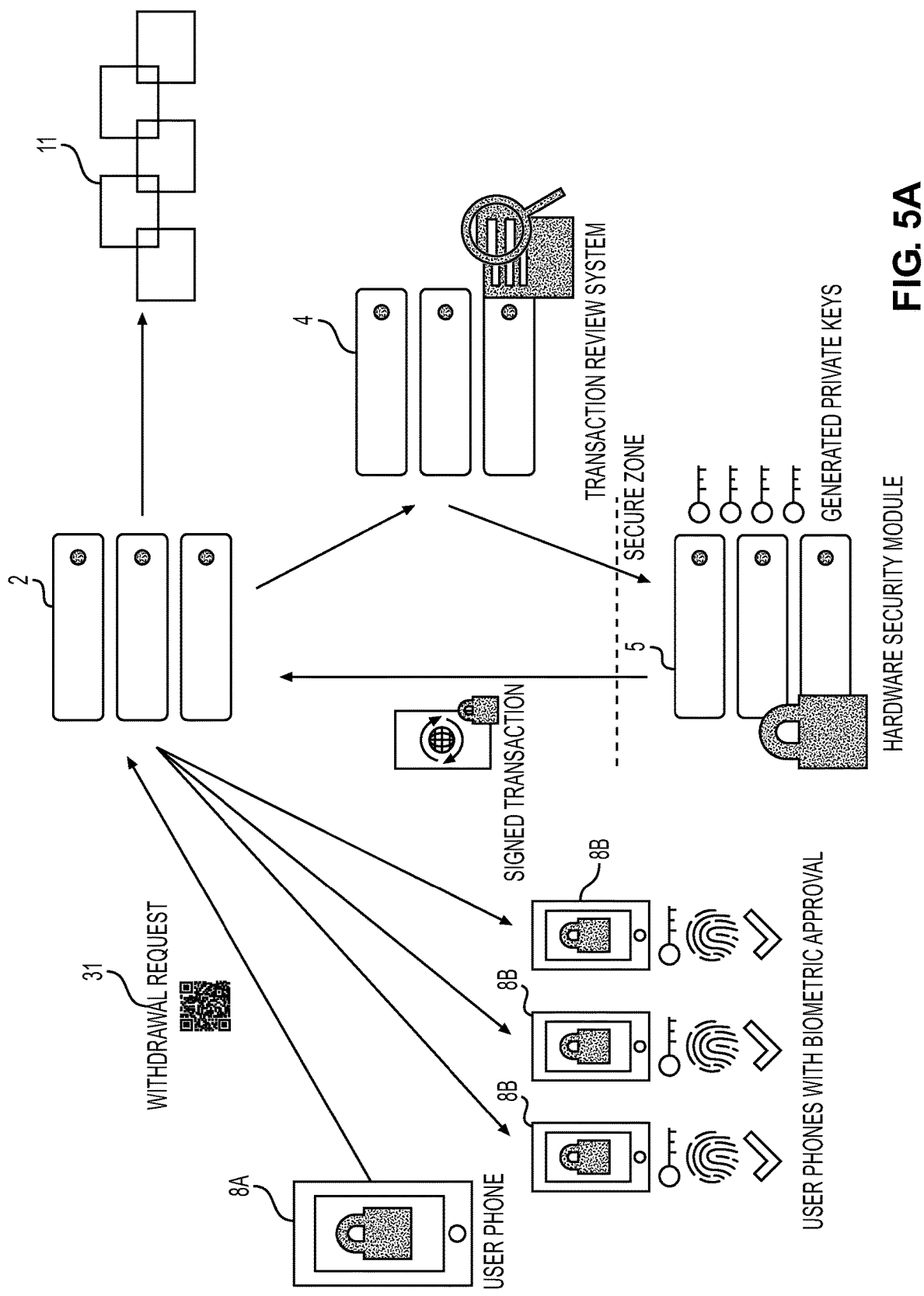
FIG. 5A is a schematic diagram showing an example of a withdrawal process flow with the CCS.
Figure 5B:
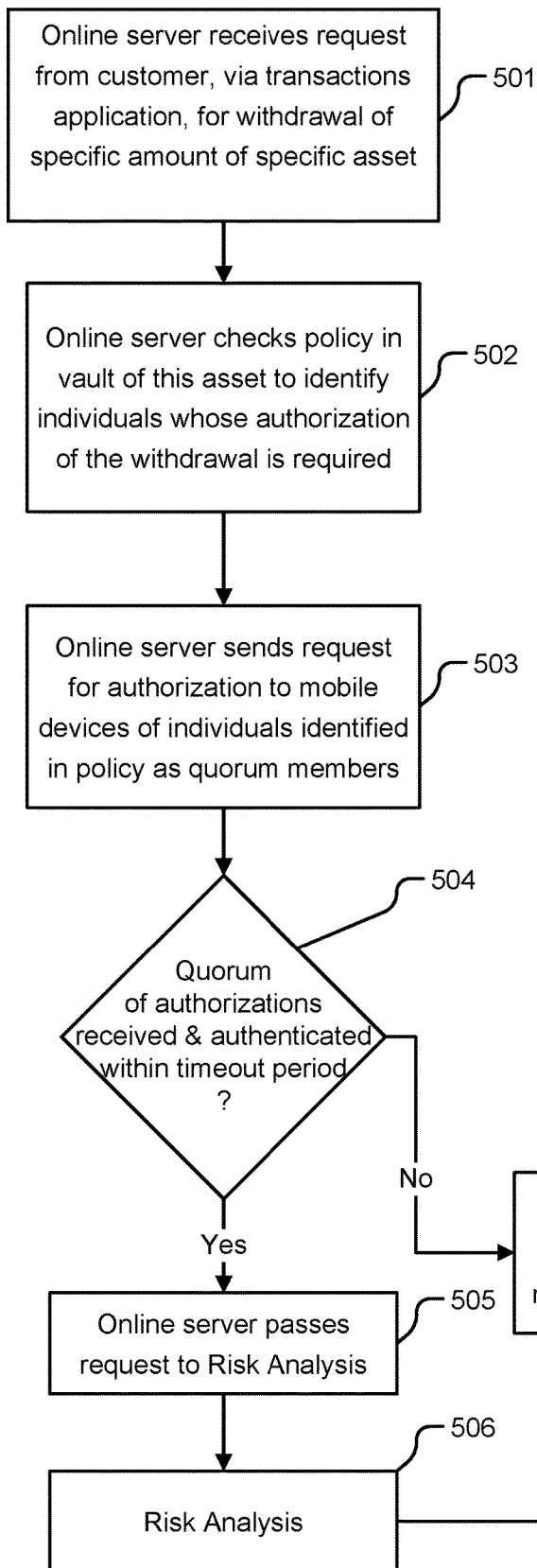
FIG. 5B is a flow diagram showing an example of the withdrawal process flow.
Figure 5B:
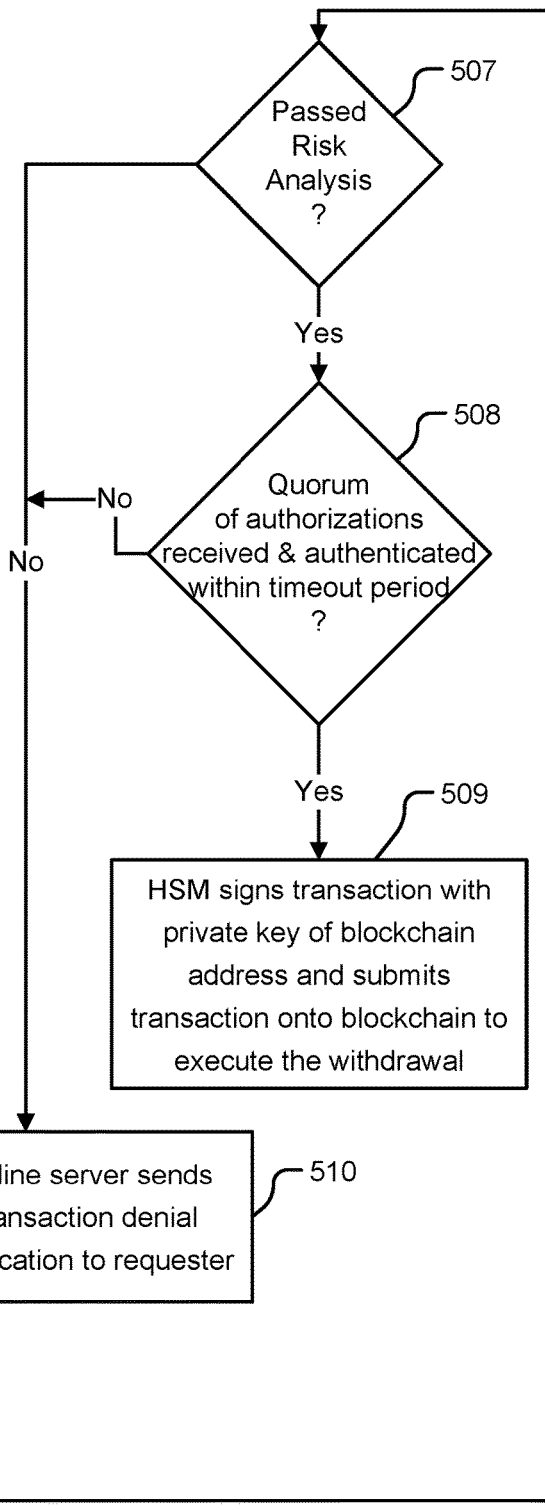

FIGS. 5A and 5B show an example of the process of withdrawing an amount of a previously deposited cryptoasset, such as cryptocurrency. Withdrawals can be initiated from the CCS application on a user device 8A by selecting a specific cryptoasset to withdraw and an amount. Once initiated, all authorizing parties are made aware of the withdrawal request and are required to authorize it individually on their mobile devices 8B.

During this process users are required to review the transaction and approve it, where each user's approval is subject to biometric authentication (e.g., fingerprint, facial recognition and/or voice recognition). In some embodiments, before a withdrawal can successfully move on to the next phase, every request is sent to the risk analysis stage to be inspected for suspicious activity and authorized as legitimate. The HSM 5 validates that a defined quorum (e.g., a majority) of users authorized the transaction, and that the transaction was approved by the risk review stage 4. For example, for a given corporate customer that has five distinct employees who require the ability to transfer funds, a suitable quorum configuration might be to have a group of three of those five employees be necessary to move any funds. The HSM 5 then proceeds with the signature and submission of the asset-moving transaction to the blockchain 11.

An example of the withdrawal process is further shown in FIG. 5B. The online server 2 initially receives 501 the withdrawal request 31 from the customer. The online server 2 then checks 502 the approval policy for the cryptoasset that is the subject of the transaction, as indicated in the vault of the cryptoasset, to determine which individuals' authorizations (endorsements) may be used to satisfy a quorum to approve the withdrawal. The online server 2 then sends 503 endorsement requests to the mobile devices 8A, 8B of those individuals (the mobile devices have been previously registered with the CCS 1). In response to these requests, one or more endorsement messages may be received from users' mobile devices 8A, 8B, where the endorsement messages were signed locally by the users' respective private keys stored securely in their respective mobile devices and subjected to one or more biometric authentication techniques, as described further below. Accordingly, the online server 2 determines 504 whether, within a timeout period, a quorum of authorizations have been received and the corresponding authorizing parties have been authenticated, as specified in the policy for this cryptoasset. If so, the online server 2 passes 505 the transaction request 31 to the risk analysis stage 4. Otherwise, the online server sends 510 a transaction denial notification to at least the user who requested the transaction (and possibly to all other users identified in the policy for this cryptoasset).

The risk analysis stage 4 performs a risk analysis 506, which as noted above may be fully or partially automated, or in some embodiments may be performed entirely by one or more human beings (based on computer output data). If the transaction passes risk analysis 506, then control flow is passed to the HSM 5, which verifies 508 that the quorum requirement has been satisfied, by performing the same determination as determination 504 or a similar determination, as does the risk analysis 506 (described further below). If satisfaction of the quorum is verified by the HSM 5, the HSM signs the withdrawal transaction with the private key of the blockchain address and submits the transaction onto the blockchain 11 to execute the withdrawal 509. Otherwise, the HSM 5 signals a failure to the online server 2, which in response sends 510 a transaction denial notification to at least the user who requested the transaction (and possibly to all other users identified in the policy for this cryptoasset).

User Authentication

As mentioned above, when a user endorses a transaction request, they are subjected to one or more forms of authentication by their mobile device and/or the CCS 1, to establish that they are the expected person taking the action. These authentication forms may include one or more biometric authentication techniques, such as fingerprint verification, voiceprint verification, speech recognition, facial recognition and/or gesture recognition. The user's mobile device (e.g., smartphone) may perform one or more of these authentication techniques.

Additionally, or alternatively, the user may be required to upload to the CCS 1 a video, captured by their mobile device, from which their identity can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction. These challenges may be generated deterministically based on the context of the transaction. For example, based on critical information in a transaction such as the ID, amount, destination, etc., the CCS 1 may generate a random number that can be used to select a few (e.g., three to five) words from a set of known words. The CCS 1 may present those words to the user and have the user speak them in a video captured by the user's mobile device, which the user's mobile device then transmits to the CCS 1. When reviewing the transaction, the reviewing mechanism or a human reviewer can independently generate the expected words based on transaction data and verify that the user spoke those words. The video can also be subject to facial and/or voice recognition. By performing this type of deterministic challenge generation, an attacker can be prevented from faking a transaction by capturing and reusing previously transmitted authentication videos from the user.

HSM Logic

With reference to FIGS. 3A and 3B, the main role of the HSM 5 is to verify the validity of operations. The HSM 5 carries out the will of the signers and authenticates that the signers are the authorized parties of an operation through the HSM's privileged access to keys. Keys needed for signing transactions can be stored securely in the HSM 5 and never leave it. In some embodiments, the HSM 5 enforces these policies through a Secure Execution Environment (SEE) that runs code that cannot be changed except through physical access to the HSM 5 and requires a set of smartcards held securely by multiple employees of the Cryptoasset Custodian.

In some embodiments, to facilitate the above-mentioned functionality the HSM 5 stores, in its internal storage 7 multiple instances of a data structure called "Organization," i.e., one instance for each customer of the Cryptoasset Custodian. The Organization data structure may contain the following fields: an identifier (ID) of the organization, a name of the organization, a public key of the organization, a list of users who belong to the organization, a policy map, a list of vaults that belong to the organization and their respective policy maps, and a generation number that is incremented each time the organization structure is updated. A "policy map" is a set of policies. In one implementation, a policy map includes one policy for each possible action of a variety of actions that may be carried out (e.g., add user, change vault policy, etc.). An Organization is signed by the HSM, using the Organization's private key (which is stored in the HSM 5 and cannot be read by any external entity), to indicate that it was produced through a valid set of changes authorized by the users and risk reviewers. The HSM keeps track of the most recent version to prevent rollback attacks.

To onboard a new customer, the HSM 5 creates a new Organization instance. To help ensure adequate security, the HSM 5 may create the Organization with the requested set of users already in it. In some embodiments, the HSM 5 must generate new unique keys for every new Organization created this way. This prevents an attacker from asking the HSM 5 to generate a "new" organization that has the same ID as an existing one and tricking users into trusting it instead.

Furthermore, as noted above, the HSM 5 can be implemented as HSM 300, or similarly, the HSM 300 can be implemented as HSM 5 in CCS 1. Thus, HSM 5 need not store the private keys 21 in the internal secure storage facility 7, but rather can regenerate the private keys 21, as needed, in some embodiments. Likewise, the HSM 5 need not store the Organization's private key in the internal secure storage facility 7, but rather can regenerate the Organization's private key, as needed, in some embodiments. Similarly, the HSM 5 need not store the Organization data structure in the internal secure storage facility 7. In some embodiments, the Organization data structure is digitally signed by the Organization's private key, which in turn is encrypted using the HSM's master key, and so the encrypted private key of the Organization and the Organization data structure can be stored elsewhere and provided to the HSM when needed for processing by the HSM.

Figure 5C:
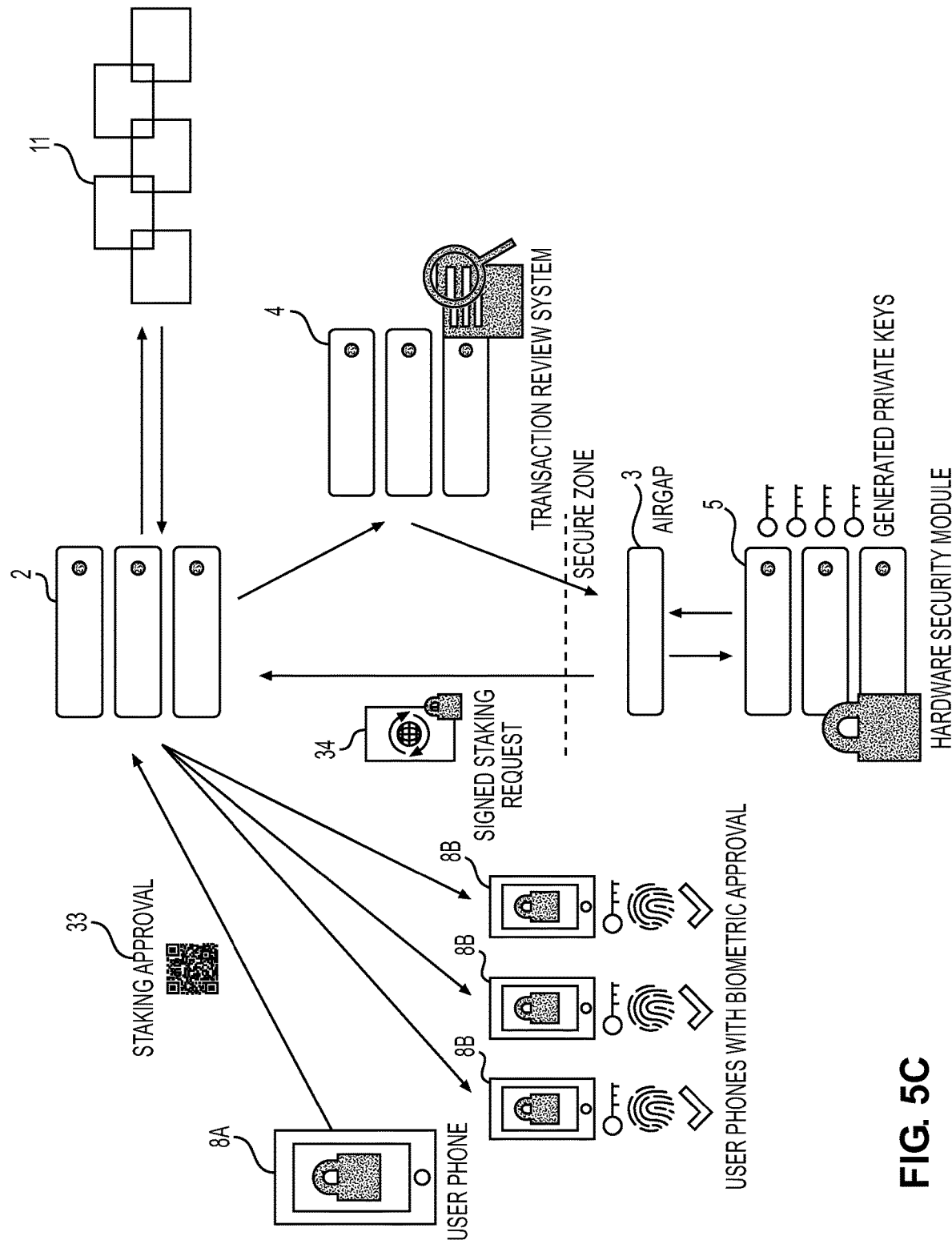
FIG. 5C is a schematic diagram showing an example of a staking process flow with the CCS.

FIG. 5C is a schematic diagram showing an example of a staking process flow with the CCS 1. A staking approval request can be initiated from the CCS application on the user device 8A by selecting a specific cryptoasset (or cryptoassets) and sending a request 33 for staking approval to the online server 2. Once initiated, all authorizing parties are made aware of the staking request and are required to authorize it individually on their mobile devices 8B. During this process users are required to review the transaction and approve it, where each user's approval is subject to biometric authentication (e.g., fingerprint, facial recognition and/or voice recognition). In some embodiments, before a staking request can successfully move on to the next phase, every such request is sent to the risk analysis stage 4 to be inspected for suspicious activity and authorized as legitimate.

If the risk analysis stage 4 approves the staking request, the CCS 1 then monitors the blockchain network 11 for indicators that it is time to stake. At the appropriate time, the CCS 1 sends the staking request to the secure zone to sign the staking request. The relay server 3 communicates the staking request across the airgap to the HSM 5. The HSM 5 validates that a defined quorum (e.g., a majority) of users authorized the staking request, and that the staking request was approved by the risk review stage 4. For example, for a given corporate customer that has five distinct employees who require the ability to transfer funds, a suitable quorum configuration might be to have a group of three of those five employees be necessary to stake any funds. Note that the relay server 3 can also perform these checks before sending the staking request to the HSM 5 for approval.

The HSM 5 then digitally signs the staking request to generate a signed staking request 34, which is returned through the airgap to the relay server 3 for communication to the online server 2 of the CCS 1. The CCS 1 sends the signed staking request 34 to the blockchain network 11 and monitors for success.

Figure 6:
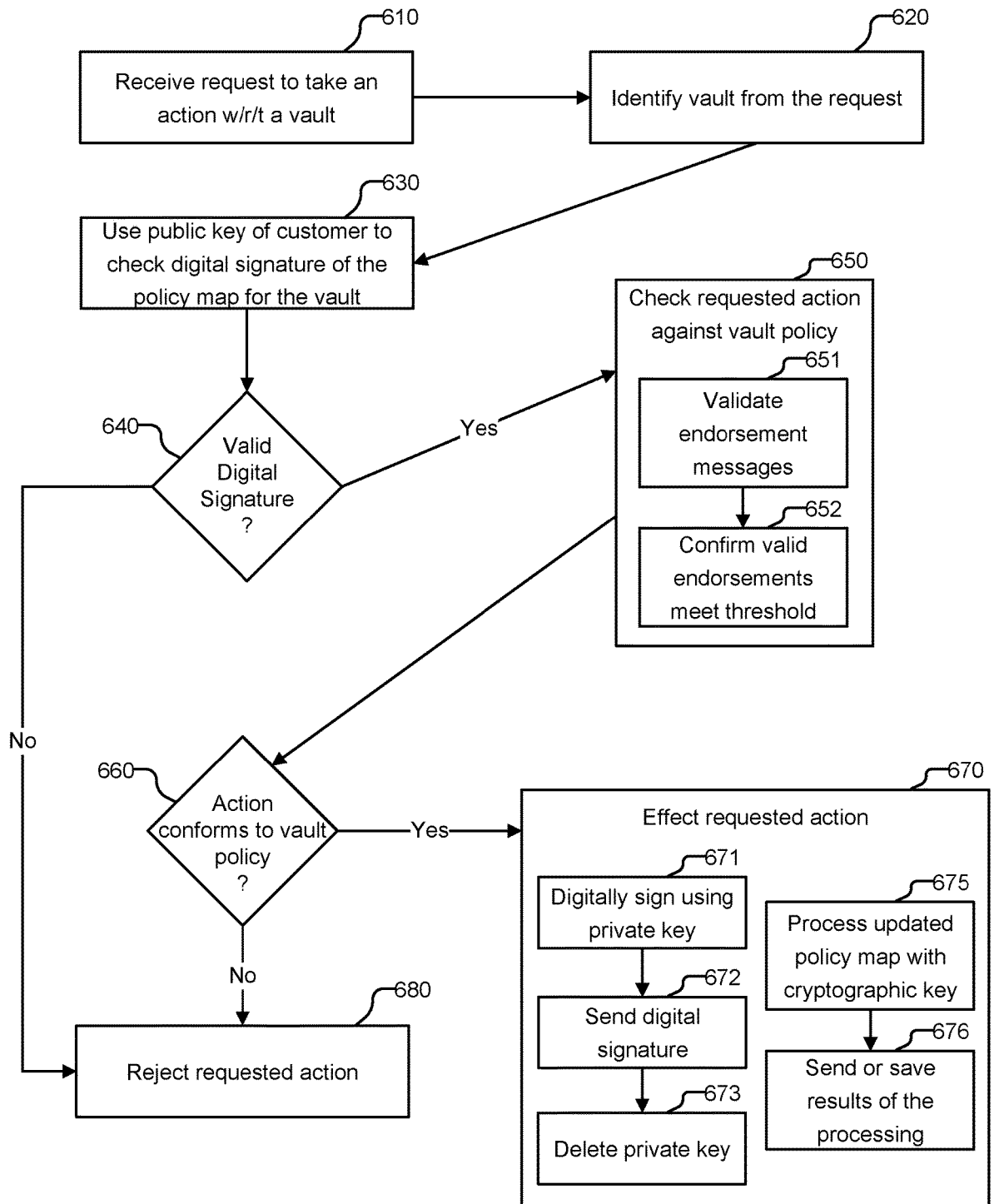
FIG. 6 is a flow diagram showing an example of a process performed by an HSM in connection with a requested operation.

FIG. 6 is a flow diagram showing an example of a process performed by an HSM 5, 130, 300 in connection with a requested operation (also referred to as a requested action). A request is received 610 to take an action with respect to a vault of multiple different vaults in a cryptoasset custodial system. As described above, the multiple different vaults are logical groupings of cryptoassets associated with a user (e.g., a customer and/or customer's employee and/or retail customer) of the cryptoasset custodial system. In some embodiments, the request includes additional information needed by the HSM 5, 130, 300 to process the request, such as a policy map for a vault, e.g., in an Organization data structure. Moreover, various types of requested actions are possible, including deposits, withdrawals, transfers, policy updates, etc. Further, requests to use the key can include details about what exactly is being signed. For instance, for a withdrawal, the system can validate that the user signed: the destination address; the amount being sent; the fee being used; and the hash of the actual transaction so it can't be replayed. The HSM deserializes the transaction and ensures that all of the user's intended values match what's there.

A vault is identified 620 from the received request. This can involve extracting a Vault ID from the request itself, or determining a Vault ID from other information in the request. For example, the request can include an Asset ID, from which the HSM can use to look up the Vault ID in a database. Other information used by the HSM, such as a public key of a customer that owns the vault, can be extracted from the request or can be determined or derived from information in the request.

The public key of the customer that owns the vault is used 630 to check a digital signature of a policy map for the vault. The digitally signed policy map can be stored on the HSM, provided to the HSM along with the request, or obtained by the HSM in response to the request. In any case, the digital signature of the policy map is checked before the HSM allows the requested action to proceed with respect to the vault.

If the digital signature is not valid 640, the requested action is rejected 680. If the digital signature is valid 640, the requested action is checked 650 against one or more policies specified by the policy map for the vault. As described above, various rules can be defined by the policy map, including quorum requirements. Thus, in some embodiments, the check 650 includes validating 651 endorsement messages from at least a subset of individual users of the cryptoasset custodial system, as specified by the policy map, and confirming 652 that the number of valid endorsements meets a threshold, as specified by the policy map. Validating 651 the endorsement messages can include checking cryptographic digital signatures using public keys corresponding to the subset of the specified individual users. Further details of examples of such quorum-based policies are described in connection with FIGS. 5A, 5B and 7.

If the requested action does not conform 660 to the rules of the policy map for the vault, the requested action is rejected 680. If the requested action does conform 660 to the rules of the policy map for the vault, the requested action is effected 670 by the HSM. Note that amount of processing 670 performed by the HSM can vary with the action requested and the details of implementation in various embodiments. At a minimum, the HSM will perform at least one cryptographic processing operation and then send and/or save a result of this processing to effect 670 the action.

For example, the HSM can digitally sign 671 some data (e.g., at least a portion of the request) using a private key (e.g., a cryptoasset private key) and then send 672 the digital signature to an appropriate recipient (e.g., to a blockchain network) for further processing. In addition, if the HSM regenerates private keys as needed, the HSM can then delete 673 the private key used in the digital signature process. Note that while a KDF approach to key generation is described, the cryptographic keys can be generated in other manners and stored on the HSM(s). As another example of an action, the HSM can process 675 an updated policy map with a cryptographic key (e.g., encrypt the updated policy map with a symmetric key of the customer, or digitally sign the updated policy map with a private portion of an asymmetric key of the customer) and then send or save 676 the results of this processing. In some embodiments, the HSM also updates the policy map itself based on received instructions, and in some embodiments, the HSM receives the updated policy map along with the request to authorize and secure the update. Other actions, policies, and additional security measures can also be employed.

Figure 7:
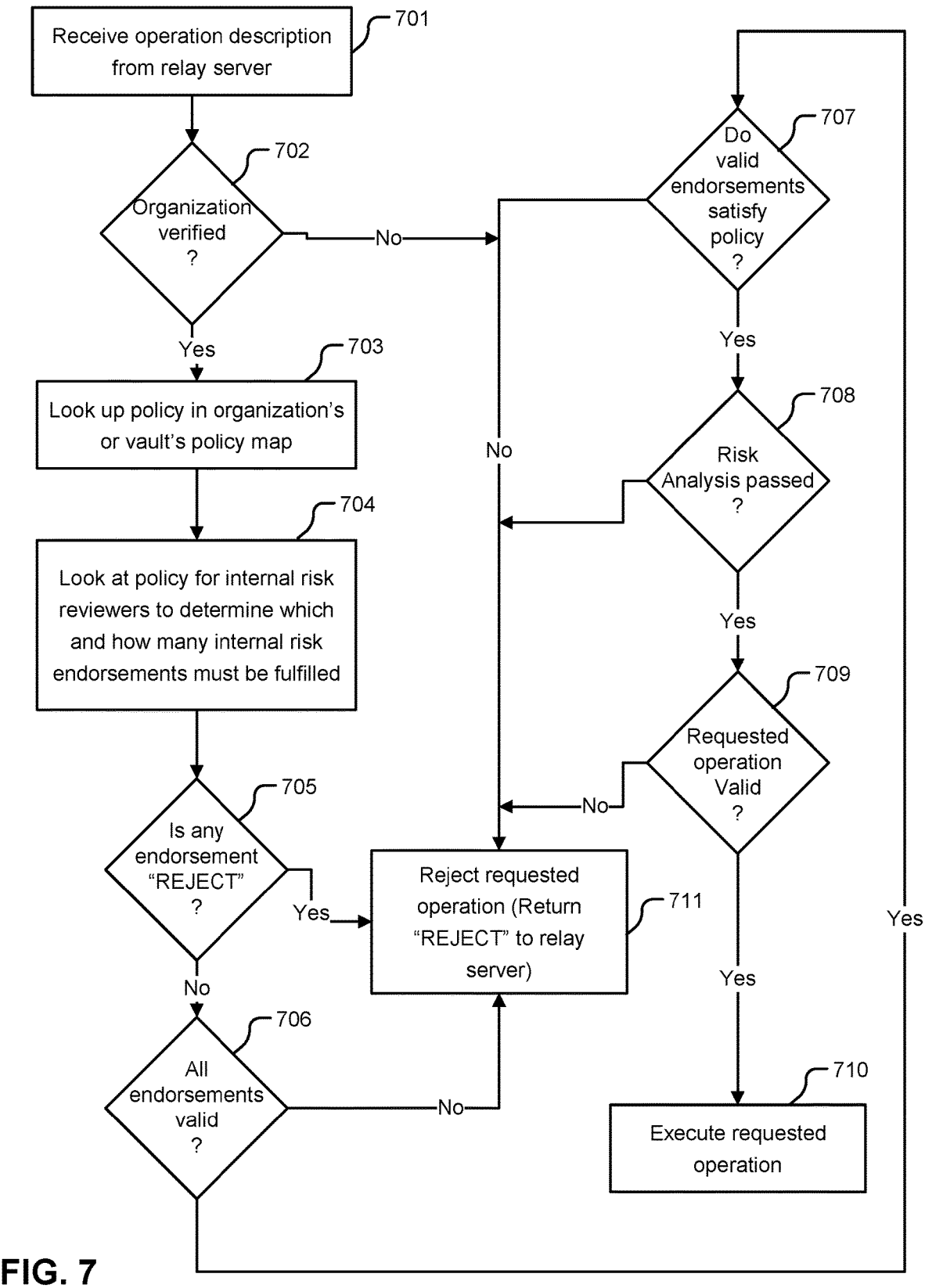
FIG. 7 is a flow diagram showing an example of another process performed by an HSM in connection with a requested operation.

FIG. 7 shows an example of a process that may be performed by the HSM 5, in at least some embodiments, in response to a request to carry out an operation. The request may be received by the HSM 5 from the relay server 3. Initially, the HSM 5 receives 701 from the relay server 3 an operation description, which specifies an Organization. The operation description is a set of data and metadata describing a requested operation, such as a requested deposit, withdrawal or transfer of cryptocurrency. The HSM 5 then verifies 702 the integrity of the specified Organization.

The HSM 5 then looks up 703 the policy in the Organization's or the vault's policy map. It then looks at the policy for internal risk reviewers to determine 704 which and how many internal risk endorsements (i.e., endorsements by personnel of the Cryptoasset Custodian) must be fulfilled. Next, the HSM 5 determines 705 whether any of the received endorsements (from users) indicates to "REJECT" the requested operation. If so, the HSM 5 rejects 711 the requested operation, by returning a "REJECT" message to the relay server, which then returns a corresponding "REJECT" message to the online server, to cause notification to the requester. In this case, the HSM 5 does not bother checking the signatures and just rejects the operation.

The HSM 5 then determines 706 whether all of the received endorsements for the transaction are valid. This includes verifying the validity of the endorsements provided by checking that: i) the user is in the Organization, ii) the signature is correct for the specified operation, and iii) each of the signatures has an "APPROVE" decision. If not all of the received endorsements for the transaction are valid, the process proceeds to rejection 711 as described above.

If all received endorsements for the transaction are valid, the HSM 5 then determines 707 whether the endorsements satisfy the relevant policy for the subject cryptoasset (i.e., satisfy the specified quorum). If the valid endorsements do not satisfy the policy, the process proceeds to rejection 711 as described above. If the endorsements satisfy the policy, then the HSM 5 determines 708 whether the requested operation passed the risk analysis stage. If not, the process proceeds to rejection 711 as described above. If the requested operation passed the risk analysis stage, the HSM 5 determines 709 whether the requested operation is valid. This can include verifying that the operation is internally consistent and that the operation can be applied to the Organization, vault or asset that it targets. If the requested operation is not valid, the process proceeds to rejection 711 as described above. Otherwise, the HSM 5 executes 710 the requested operation (or triggers an action to cause it to be executed). An operation to change the Organization, vault or policy results in a new signed Organization data structure with a higher generation value and the change applied to it. An operation to withdraw assets results in the HSM 5 signing a blockchain transaction with the private key corresponding to the subject asset. An operation to deposit assets results in the HSM 5 generating a deposit address.

Offline Device Endorsements

As a method for reducing the risk for users interacting with the CCS application on their personal devices, the CCS 1 may require authorization from an offline device. This device, such as a consumer phone with secure enclave or similarly capable computing device such as an iPod Touch, will be completely disconnected from the Internet in its normal state, and used in an offline manner to sign transactions required for authorization.

The process may be carried out as follows. The user has a phone or similar device that is a member of his or her vault policy's quorum and is not connected to any wireless or cellular networks. The device runs software similar to the CCS application software for enabling a user to endorse requested transactions, or the same software operating in a different mode. The user initiates a transaction against his or her vault through a different device in the quorum. An online device, such as another phone or web browser, has access to the transaction. It may be another phone/secure device in the quorum or it may exist solely for the purpose of displaying transactions. The device has the ability to transmit data that is required to be signed by the offline device, to the offline device. This can be done through a channel that cannot be accessed over the Internet, such as displaying a QR code, playing a sound or sequence of sounds that encodes data, or transmitting over Bluetooth. The offline device displays the data that was transmitted for it to sign, for the user's approval or rejection. The offline device signs its endorsement of the operation based on the user's desired action. The offline device communicates its signed payload back to the online device in a similar manner to how it was received (e.g., displaying a QR code, playing a sound or sequence of sounds that encodes data, or transmitting over Bluetooth). The online device communicates the signed decision payload back to the online server of the CCS 1.

Figure 8:
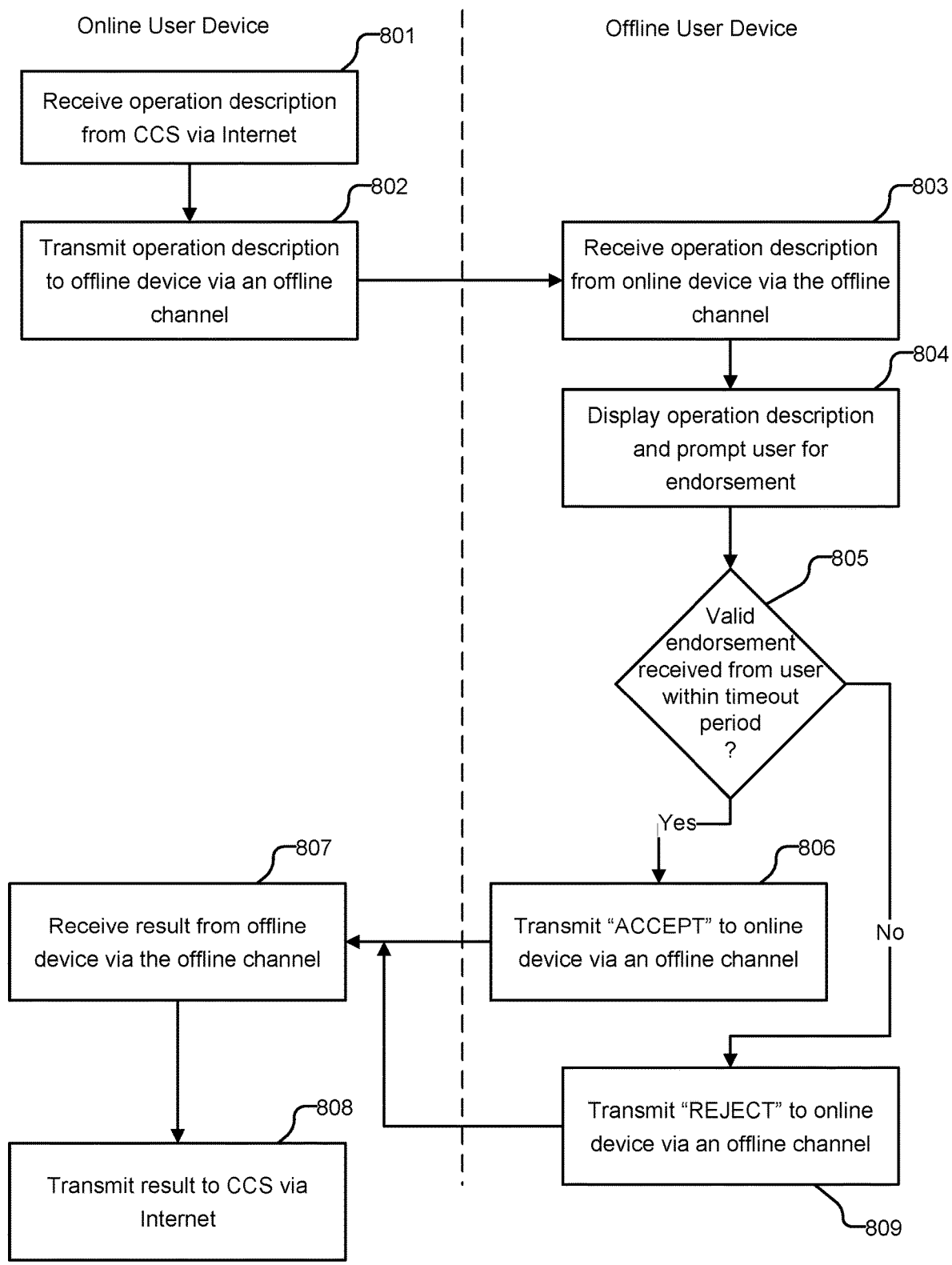
FIG. 8 is a flow diagram showing an example of a process for using an offline user device to endorse a requested transaction.

FIG. 8 is a flow diagram that further shows this process, according to some embodiments. An online user device receives 801 an operation description from the CCS via the Internet. The online user device then transmits 802 the operation description (or a portion thereof) to the offline user device file an offline channel. As noted above, the offline channel is a channel that is not accessible via the Internet, such as a local visual display by the online user device, a sound or sequence of sounds generated by the online user device, or a short range wireless transmission from the online user device (e.g., via Bluetooth). The offline user device receives 803 the operation description from the online user device via the offline channel, and based on the information thereby received, displays the operation description (or portion thereof) and prompts 804 the user for endorsement of the operation. If a valid endorsement is received 805 by the offline device as user input within a timeout period, the offline device transmits 806 an "ACCEPT" message to the online user device via the same offline channel by which it received the operation description, or via a different offline channel. The online user device then receives 807 the results of the endorsement from the offline device and transmits 808 the result payload to the CCS via the Internet. If a valid endorsement is not received 805 by the offline user device from the user within the timeout period, the offline user device transmits a "REJECT" message to the online user device via the offline channel, which in turn transmits 809 the "REJECT" payload to the CCS via the Internet.

The offline device may be delivered to the user with its secure key pre-enrolled in the Organization, or it may be allowed to be online for the initial enrollment process, or it may send its enrollment through a similar procedure to the authorization process.

The CCS software on the offline device may need to be updated periodically. To allow such updates, the offline device may be scheduled to connect to the Internet via Wi-Fi and have its software updated at a predefined cadence, or it may detect that its software needs to be updated as a result of receiving a transaction to sign from the online user device, that indicates that the version of the software on the offline device is no longer compatible. Whenever the device is online, it can record as well as attempt to transmit to the CCS 1 the fact that it can access the Internet so that that information may be used to assess risk by the platform at a later time.

In addition to being kept offline, the offline user device and one or more online devices may be restricted to act on a transaction only when in range of a predefined beacon. A wireless (e.g., Bluetooth) beacon device can be made available to the user, and the CCS application may refuse to authorize transactions unless it detects that the beacon is available.

Auditability and Proof of Ownership

Every transaction submitted to the CCS 1 is recorded in an internal ledger that is tamper-resistant and that allows auditors to have cryptographic proof of every historical event on every user's account. The ownership of a blockchain asset is controlled by the possession of the private key corresponding to the public wallet address. The CCS can prove ownership of these assets to auditors by making use of the private key corresponding to a user's vault to sign a string of randomly chosen text chosen by the auditors. Consider the following example:

An auditor wishes to see proof that the CCS has access to funds in wallet identified by the address, "1BvBMSEYstn5Au4m4GFg7yJaNVN2." The auditor therefore randomly generates a long string, e.g., "xGG8vQFnd8QDwHz6Uj1GX," and submits the following challenge:

```
{
    Address: 1BvBMSEYstn5Au4m4GFg7yJaNVN2 ,
    Token: " AUDIT-CHALLENGE- xGG8vQFnd8QDwHz6Uj1GX",
}
```

The CCS 1 receives the challenge and forwards it to the HSM 5 as a predefined template serialized package. The HSM 5 is programmed to accept and sign such audit requests (which are not arbitrary payloads and therefore are not at risk of being later interpreted as a signed blockchain transaction) with the private key associated with the specified address. The CCS 1 then returns the valid signature for the challenge that can be independently verified by the auditor. This verification proves that the CCS 1 has control over a private key associated with an entry on the blockchain, achieving proof of control of the asset.

Thresholding Service

In some embodiments, the CCS 1 includes a Thresholding Service that enables other parts of the system (Risk Analysis stage 4 and HSM 5) to securely determine that user operations and transactions have followed the customer specific business logic and have been approved by a human/automated risk review system. The Thresholding Service can verify multi-signature (multi-user) quorums to achieve this.

The Thresholding Service validates operations initiated and approved by users to ensure that they've met a threshold quorum before being executed. Such operations may include transactions, adding or removing other users, etc. Different users can have different access control roles (e.g., view-only, initiate-transaction-only, authorizable, necessary). The CCS 1 is able to notify every reportable status of the quorum acceptance lifecycle, but is not able to sign-off on operations that have not been authorized by customers. All actions are logged in an append-only ledger for auditability over all account interactions.

One function of the Thresholding Service is to verify that a quorum of authorized users have signed-off on a requested operation. Qualifying operations that may require a quorum may include, for example, proposing a transaction (e.g., "withdraw 300 Bitcoin"), adding a user to an account, changing a user's permissions, removing a user from an account, and changing the thresholding logic. A quorum may be defined as an absolute majority of users by default (e.g., 3 out of 5), or it may be set to a custom quorum upon onboarding of the customer. Moreover, an authorized user can configure a quorum to require certain specific users to endorse a transaction to constitute a quorum. The CCS 1 may also allow thresholding across multiple required groups. For example, in a company a majority of the finance team may be required to sign off, as well as the front office.

In some embodiments, the Thresholding Service implements a fine-grained access control model in its quorum verification, in which different users can have different access levels, which may include the following levels, for example:

View-only
    This is the default access level
    Users in this level can view all asset positions
    Users in this level can flag any transaction
    Users in this level can freeze all assets View-authorize
    Users in this level can act as an authorizing vote for an action toward a quorum
    Users in this level can view all asset positions
    Users in this level can flag any transaction
    Users in this level can freeze all assets View-authorize-necessary
    Users in this level are a required vote for an action
    Users in this level can view all asset positions
    Users in this level can flag any transaction
    Users in this level can freeze all assets In some embodiments, the access level for a user can only be changed with an appropriately verified quorum that is verified by the Thresholding Service.

As noted above, user approvals for an action can be expressed by a cryptographic digital signature, to benefit from non-repudiation guarantees. The Cryptoasset Custodian can be certain that the associated user who holds the private key was indeed the user who approved the action, since digital signatures cannot be forged. In some embodiments, a user's signature is generated from an iOS secure enclave in the user's mobile device, and forwarded to the CCS 1 by the iOS application programming interface (API) component in the user device 8. Signatures can be performed over the cryptographic hash of the transaction contents to ensure that the transaction cannot be tampered with. All users may be required to sign the same hash for the same transaction identifier (ID) in order for the signatures to count toward the quorum. The Thresholding Service can provide templates for the clients to sign, and can verify all completed signatures completed by the iOS client. In at least some embodiments, the Thresholding Service verifies signatures with the public components of the users' signing keys, but does not hold the private components of those user signing keys.

Once a threshold has been satisfied, the Thresholding Service will publish the corresponding signature data to the Risk Analysis stage to be further analyzed before sign-off by the Risk Analysis stage, and will serialize the signature data into a payload to be consumed by the HSM signing service. Each additional signature provided to the Thresholding Service and verification can be recorded in the append-only log service. This will provide additional auditing and status updates in addition to the metadata captured in the Thresholding Service's storage, which will be essential for providing consumable updates to user clients.

Maintaining Quorum Liveness

It is assumed that authorized members of a quorum are available to cryptographically sign transactions. Therefore, the quorum should be kept "live"—that is, at any given time, the CCS 1 has reasonable confidence that all potential members of the quorum maintain possession of their secure device keys and can actively participate in a transaction. In some embodiments, the CCS 1 can do the following to achieve this level of confidence:

1. Have access to the set of user public keys required to fulfill a policy's quorums.
2. Set a liveness threshold for a policy, i.e., the amount of time after which one considers a key to be at risk of unavailability. This can be fixed or related to normal transaction cadence.
3. Require users to periodically sign a proof transaction with their private keys. This can be explicit as a liveness check or hidden/implicit by requiring their key for routine operations such as login.
4. Record the latest live time of any one or more users' keys.

5. Continuously monitor whether any user's live time has exceeded the liveness threshold.
6. Use the above information to prompt the user to prove they still have access to their signing key and/or inform other users that the quorum may be at risk.

Risk Analysis Stage

The Risk Analysis stage 4 can implement an API, called the Risk API, and can further include human review of all transactions and administrative user operations. In some embodiments the Risk API drives the human review system. The Risk API can provide integration with an internal risk dashboard, for human employees of the Cryptoasset Custodian to manually review each transaction.

In some embodiments, all transactions are manually approved by designated employee(s); all administrative user operations (adding, removing, permission changes) are manually approved by designated Cryptoasset Custodian employee(s); reviewable entities must have passed an automated verification process before requiring risk analysis; reviewable entities must provide robust context about the user approvals, for both human and further automated inspection; and risk approvals and denials are logged in an append-only ledger for auditability.

The Risk API reverifies the appropriate threshold as determined by the Thresholding Service. The Risk API may also handle additional business logic, such as in embodiments where the Thresholding Service is simplified: for example, the Risk API could check for necessary signers if the Thresholding Service only checks for quorums. Other functions described herein can also be moved between modules.

The Risk API can receive contextual data about each user involved in a transaction, to present to a human and/or classification system. This information may include, for example, user(s) who approved the transaction, time of approval(s), location of approval(s), and device/key ID(s) that approved the transaction. This data can be fed into an internal Risk Analysis dashboard, and possibly other automated review systems.

In some embodiments, the Risk API requires human approval from one or more employees of the Cryptoasset Custodian if a transaction passes the manual and automated risk review. To approve, an employee may be required to sign with a cryptographic key if he or she approves the transaction/operation and present the signature to the Risk API for validation. Moreover, there are preferably multiple keys, one per risk reviewer, such that it is logged who performed the review. Preferably it is made easy to rotate a risk-approval key in case of compromise.

Examples of Physical Computing Environments

Figure 9:
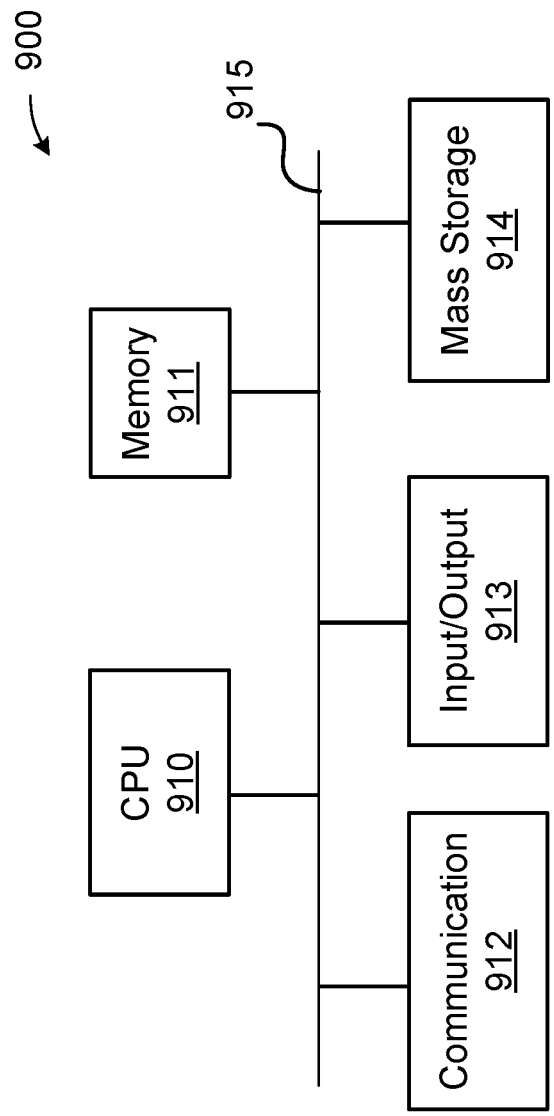
FIG. 9 is a block diagram showing an example of a hardware architecture of a processing system that can be used to implement some or all of the CCS or a user device.

FIG. 9 shows an example of a hardware architecture of a processing system that can be used to implement some or all of the CCS, or (separately) any user device, or both. The CCS can include one or more instances of an architecture such as shown in FIG. 9, where multiple such instances can be coupled to each other via one or more private networks.

The shown processing system 900 includes one or more processors, including a CPU 910, one or more memories 911 (at least a portion of which may be used as working memory, e.g., random access memory (RAM)), one or more data communication device(s) 912, one or more input/output (I/O) devices 913, and one or more mass storage devices 914, all coupled to each other through an interconnect 915. The interconnect 915 may be or include one or more conductive traces, buses, point-to-point connections, controllers, adapters and/or other conventional connection devices. Each processor 910 controls part of the operation of the processing device 900 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 911 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 914 can be or include one or more hard drives, digital versatile disks (DVDs), flash memories, or the like. Each memory 911 and/or mass storage 914 can store (individually or collectively) data and instructions that configure the processor(s) 910 to execute operations to implement the techniques described above. Each communication device 912 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 900, each I/O device 913 can be or include a device such as a display (which may include a transparent AR display surface), audio speaker, keyboard, mouse or other pointing device, microphone, camera, etc. Note, however, that such I/O devices may be unnecessary if the processing device 900 is embodied solely as a server computer.

In the case of a user device, a communication device 912 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 912 can be or include, for example, any of the aforementioned types of communication devices, a wired Ethernet adapter, cable modem, DSL modem, or the like, or a combination of such devices.

Unless contrary to physical possibility, it is envisioned that (i) the methods/operations described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a computer-readable storage medium and may be executed by one or more general-purpose or special-purpose programmable microprocessors. A "computer-readable medium", as the term is used herein, includes any mechanism that can tangibly store information in a non-transitory form accessible by a machine (a machine may be, for example, a computer, network device, cellular phone, personal digital assistant (PDA), manufacturing tool, any device with one or more processors, etc.). For example, a computer-readable medium includes recordable/non-recordable media (e.g., RAM or ROM; magnetic disk storage media; optical storage media; flash memory devices; etc.), etc.

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/operations described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving, by an online server computer of a cryptoasset custodial system, a request to authorize a staking operation for a proof-of-stake protocol associated with a blockchain, wherein the staking operation is associated with a private key of a cryptographic key pair, wherein the private key is stored only within a hardware security module of the cryptoasset custodial system and is inaccessible to devices external to the hardware security module;
performing, in response to the request, at least a portion of the proof-of-stake protocol in the hardware security module using logic designed for the proof-of-stake protocol;
verifying, in the hardware security module, a policy map specifying a plurality of users of the cryptoasset custodial system and a threshold number of the plurality of users to approve the staking operation;
validating, in the hardware security module, endorsement messages from at least a subset of the plurality of users of the cryptoasset custodial system by checking cryptographic digital signatures using public keys corresponding to the subset of the plurality of users;
digitally signing, in the hardware security module, using the logic in the hardware security module and the private key, a staking transaction associated with the staking operation when the staking operation is in accordance with control rules of the policy map and after endorsement messages from the subset of the plurality of users have been validated for the threshold number of the plurality of users;
transmitting, by the online server computer, the digitally signed staking transaction to a blockchain network to effect the staking operation on a node on behalf of the user;
monitoring, by the cryptoasset custodial system, the blockchain network to identify one or more additional staking opportunities; and
in response to identifying the one or more additional staking opportunities, modifying, by the cryptoasset custodial system, the staking operation on behalf of the user to improve rewards provided to the user.

2. The method of claim 1, wherein monitoring the blockchain network to identify one or more additional staking opportunities further comprises detecting a new staking protocol that offers a higher rate of return.

3. The method of claim 1, wherein monitoring the blockchain network to identify one or more additional staking opportunities further comprises detecting that a validator of a plurality of validators is likely to be selected more often than another validator of the plurality of validators for block validation at the blockchain network.

4. The method of claim 1, wherein prior to digitally signing, in the hardware security module, the staking transaction using the logic in the hardware security module and the private key, the method further comprises:
revalidating, by the hardware security module, that the staking transaction is in a format that conforms to the proof-of-stake protocol.

5. The method of claim 1, wherein the logic in the hardware security module comprises firmware code programmed to handle different staking transactions for two or more proof-of-stake protocols.

6. The method of claim 1, wherein the method further comprises:
performing a different portion of the proof-of-stake protocol in the online server computer.

7. The method of claim 1, wherein the private key is associated with an asymmetric cryptographic key pair, and wherein the method further comprises:
decrypting, in the hardware security module, an encrypted key using a hardware-based cryptographic key securely stored in the hardware security module;
generating, in the hardware security module, the private key of the asymmetric cryptographic key pair from at least the decrypted key;
digitally signing, in the hardware security module, the staking transaction using the private key generated in the hardware security module; and
deleting the private key from the hardware security module.

8. The method of claim 7, wherein generating, in the hardware security module, the private key of the asymmetric cryptographic key pair from at least the decrypted key further comprises:
generating, in the hardware security module, the private key by applying a deterministic key derivation function to one or more of: an identifier for a vault for the cryptoasset, an asset identifier for the cryptoasset, and the decrypted key controlled by the hardware security module.

9. The method of claim 1, wherein the hardware security module comprises at least one secure storage device and at least one physical computing device coupled with the at least one secure storage device.

10. A cryptoasset custodial system comprising:
one or more computer processors; and
a non-transitory computer-readable storage medium storing instructions executable by the one or more computer processors, the instructions when executed by the one or more computer processors causing the one or more computer processors to perform operations including:
receiving, by an online server computer of a cryptoasset custodial system, a request to authorize a staking operation for a proof-of-stake protocol associated with a blockchain, wherein the staking operation is associated with a private key of a cryptographic key pair, wherein the private key is stored only within a hardware security module of the cryptoasset custodial system and is inaccessible to devices external to the hardware security module;

performing, in response to the request, at least a portion of the proof-of-stake protocol in the hardware security module using logic designed for the proof-of-stake protocol;

verifying, in the hardware security module, a policy map specifying a plurality of users of the cryptoasset custodial system and a threshold number of the plurality of users to approve the staking operation;

validating, in the hardware security module, endorsement messages from at least a subset of the plurality of users of the cryptoasset custodial system by checking cryptographic digital signatures using public keys corresponding to the subset of the plurality of users;

digitally signing, in the hardware security module, using the logic in the hardware security module and the private key, a staking transaction associated with the staking operation when the staking operation is in accordance with control rules of the policy map and after endorsement messages from the subset of the plurality of users have been validated for the threshold number of the plurality of users;

transmitting, by the online server computer, the digitally signed staking transaction to a blockchain network to effect the staking operation on a node on behalf of the user;

monitoring, by the cryptoasset custodial system, the blockchain network to identify one or more additional staking opportunities; and in response to identifying the one or more additional staking opportunities, modifying, by the cryptoasset custodial system, the staking operation on behalf of the user to improve rewards provided to the user.

11. The system of claim 10, wherein monitoring the blockchain network to identify one or more additional staking opportunities further comprises detecting a new staking protocol that offers a higher rate of return.

12. The system of claim 10, wherein monitoring the blockchain network to identify one or more additional staking opportunities further comprises detecting that a validator of a plurality of validators is likely to be selected more often than another validator of the plurality of validators for block validation at the blockchain network.

13. The system of claim 10, wherein prior to digitally signing, in the hardware security module, the staking transaction using the logic in the hardware security module and the private key, the instructions cause the one or more computer processors to perform further operations including:

revalidating, by the hardware security module, that the staking transaction is in a format that conforms to the proof-of-stake protocol.

14. The system of claim 10, wherein the logic in the hardware security module comprises firmware code programmed to handle different staking transactions for two or more proof-of-stake protocols.

15. The system of claim 10, wherein the private key is associated with an asymmetric cryptographic key pair, and wherein the instructions cause the one or more computer processors to perform further operations including:

decrypting, in the hardware security module, an encrypted key using a hardware-based cryptographic key securely stored in the hardware security module;

generating, in the hardware security module, the private key of the asymmetric cryptographic key pair from at least the decrypted key;

digitally signing, in the hardware security module, the staking transaction using the private key generated in the hardware security module; and deleting the private key from the hardware security module.

16. The system of claim 10, wherein the hardware security module comprises at least one secure storage device and at least one physical computing device coupled with the at least one secure storage device.

17. A non-transitory computer-readable medium storing instructions executable by one or more computer processors of a cryptoasset custodial system, the instructions when executed by the one or more computer processors cause the one or more computer processors to perform operations comprising:

receiving, by an online server computer of the cryptoasset custodial system, a request to authorize a staking operation for a proof-of-stake protocol associated with a blockchain, wherein the staking operation is associated with a private key of a cryptographic key pair, wherein the private key is stored only within a hardware security module of the cryptoasset custodial system and is inaccessible to devices external to the hardware security module;

performing, in response to the request, at least a portion of the proof-of-stake protocol in the hardware security module using logic designed for the proof-of-stake protocol;

verifying, in the hardware security module, a policy map specifying a plurality of users of the cryptoasset custodial system and a threshold number of the plurality of users to approve the staking operation;

validating, in the hardware security module, endorsement messages from at least a subset of the plurality of users of the cryptoasset custodial system by checking cryptographic digital signatures using public keys corresponding to the subset of the plurality of users;

digitally signing, in the hardware security module, using the logic in the hardware security module and the private key, a staking transaction associated with the staking operation when the staking operation is in accordance with control rules of the policy map and after endorsement messages from the subset of the plurality of users have been validated for the threshold number of the plurality of users;

transmitting, by the online server computer, the digitally signed staking transaction to a blockchain network to effect the staking operation on a node on behalf of the user;

monitoring, by the cryptoasset custodial system, the blockchain network to identify one or more additional staking opportunities; and in response to identifying the one or more additional staking opportunities, modifying, by the cryptoasset custodial system, the staking operation on behalf of the user to improve rewards provided to the user.

18. The non-transitory computer-readable medium of claim 17, wherein monitoring the blockchain network to identify one or more additional staking opportunities further comprises detecting a new staking protocol that offers a higher rate of return.

19. The non-transitory computer-readable medium of claim 17, wherein monitoring the blockchain network to identify one or more additional staking opportunities further comprises detecting that a validator of a plurality of validators is likely to be selected more often than another validator of the plurality of validators for block validation at the blockchain network.

20. The non-transitory computer-readable medium of claim 17, wherein the logic in the hardware security module comprises firmware code programmed to handle different staking transactions for two or more proof-of-stake protocols.

* * * * *

UNITED STATES PATENT AND TRADEMARK OFFICE
CERTIFICATE OF CORRECTION

| | |
|---|---|
| PATENT NO. | : 11,757,627 B2 |
| APPLICATION NO. | : 17/715327 |
| DATED | : September 12, 2023 |
| INVENTOR(S) | : Diogo Monica et al. |

It is certified that error appears in the above-identified patent and that said Letters Patent is hereby corrected as shown below:

In the Specification

After the title and before "BACKGROUND" in Column 1, insert:
--CROSS-REFERENCE TO RELATED APPLICATION
This application is a continuation of and claims the benefit of priority to U.S. Nonprovisional Patent Application No. 16/544,628, filed on Aug. 19, 2019, which is incorporated herein by reference in its entirety.--

Signed and Sealed this
Twenty-first Day of November, 2023

*Katherine Kelly Vidal*

Katherine Kelly Vidal
*Director of the United States Patent and Trademark Office*